US012739941B2

(12) United States Patent
Malkamäki et al.

(10) Patent No.: US 12,739,941 B2
(45) Date of Patent: Sep. 15, 2026

(54) CHANGE OF MULTICAST AND BROADCAST SERVICES RADIO BEARER IDENTIFIERS DURING MULTICAST AND BROADCAST SERVICE MOBILITY

(71) Applicant: Nokia Technologies Oy, Espoo (FI)

(72) Inventors: Esa Mikael Malkamäki, Espoo (FI); David Navrátil, Helsinki (FI); Benoist Pierre Sebire, Tokyo (JP); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 763 days.

(21) Appl. No.: 18/145,122

(22) Filed: Dec. 22, 2022

(65) Prior Publication Data

US 2023/0225008 A1 Jul. 13, 2023

Related U.S. Application Data

(60) Provisional application No. 63/298,573, filed on Jan. 11, 2022.

(51) Int. Cl.
*H04W 76/40* (2018.01)
*H04W 36/00* (2009.01)

(52) U.S. Cl.
CPC ....... *H04W 76/40* (2018.02); *H04W 36/0007* (2018.08)

(58) Field of Classification Search
CPC ................................................ H04W 36/0007
See application file for complete search history.

(56) References Cited

U.S. PATENT DOCUMENTS

2025/0234250 A1* 7/2025 Wu .................. H04W 36/0007

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
"3rd Generation Partnership Project; Technical Specification Group Radio Access Network; NG-RAN; XN application protocol (XnAP) (Release 16)", 3GPP TS 38.423, V16.7.0, Oct. 2021, pp. 1-466.
"3rd Generation Partnership Project; Technical Specification Group Radio Access Network; NG-RAN; F1 application protocol (F1AP) (Release 16)", 3GPP TS 38.473, V16.7.0, Oct. 2021, pp. 1-464.

(Continued)

*Primary Examiner* — Pamit Kaur
(74) *Attorney, Agent, or Firm* — Brake Hughes Bellermann LLP

(57) ABSTRACT

Systems, methods, apparatuses, and computer program products for changing MRB ID without requiring release and add functions. One method may include receiving, by a user equipment, a RRC reconfiguration message from a network entity comprising a MRB. The MRB is identified by a first MRB ID, and the RRC reconfiguration message further comprises a second MRB ID associated with the first MRB ID. The user equipment associates the MRB with the second MRB ID configured for subsequent identification of the MRB. The user equipment receives MBS data through the MRB associated with the second MRB ID.

19 Claims, 16 Drawing Sheets

(56) References Cited

OTHER PUBLICATIONS

"3rd Generation Partnership Project; Technical Specification Group Radio Access Network; NG-RAN; E1 Application Protocol (E1AP) (Release 16)", 3GPP TS 38.463, V16.7.0, Oct. 2021, pp. 1-242.
"WID revision: NR Multicast and Broadcast Services", 3GPP TSG RAN Meeting #88-e, RP-201038, Agenda: 9.10.8, Huawei, Jun. 29-Jul. 3, 2020, 6 pages.
"38.300 Running CR for MBS in NR", 3GPP TSG-RAN WG2 Meeting #116-e, R2-2111605, CMCC, Nov. 1-12, 2021, 27 pages.
"38.331 running CR for NR MBS", 3GPP TSG-RAN WG2 Meeting #116-e, R2-2111658, Huawei, Nov. 1-12, 2021, 149 pages.
U.S. Appl. No. 63/297,062, "Methods and Apparatuses for Configuration of User Device(s) for Reception of Point-to-Multipoint Transmission", filed Jan. 6, 2022, pp. 1-45.
Finland Application No. 20216243, "Mobility in Cellular Communication Networks", filed on Dec. 3, 2021, 33 pages.
"3rd Generation Partnership Project; Technical Specification Group Radio Access Network; E-UTRA and NR; Service Data Adaptation Protocol (SDAP) specification (Release 16)", 3GPP TS 37.324, V16.3.0, Jun. 2021, pp. 1-17.
"3rd Generation Partnership Project; Technical Specification Group Radio Access Network; NR; Packet Data Convergence Protocol (PDCP) specification (Release 16)", 3GPP TS 38.323, V16.6.0, Dec. 2021, pp. 1-40.

* cited by examiner

CHANGE OF MULTICAST AND BROADCAST SERVICES RADIO BEARER IDENTIFIERS DURING MULTICAST AND BROADCAST SERVICE MOBILITY

RELATED APPLICATIONS

The present application claims priority from U.S. Provisional Application No. 63/298,573, filed Jan. 11, 2022, which is hereby included by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for changing multicast and broadcast services radio bearer (MRB) identifiers (ID) without requiring release.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The method may further include associating, by the user equipment, the multicast and broadcast radio bearer with the second multicast and broadcast service radio bearer identifier configured for subsequent identification of the multicast and broadcast radio bearer. The method may further include receiving, by the user equipment, multicast and broadcast service data through the multicast and broadcast radio bearer associated with the second multicast and broadcast service radio bearer identifier.

In accordance with certain example embodiments, an apparatus may include means for receiving a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The apparatus may further include means for associating the multicast and broadcast radio bearer with the second multicast and broadcast service radio bearer identifier configured for subsequent identification of the multicast and broadcast radio bearer. The apparatus may further include means for receiving multicast and broadcast service data through the multicast and broadcast radio bearer associated with the second multicast and broadcast service radio bearer identifier.

In accordance with various example embodiments, a non-transitory computer readable medium may be encoded with instructions that may, when executed in hardware, perform a method. The method may include receiving a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The method may further include associating the multicast and broadcast radio bearer with the second multicast and broadcast service radio bearer identifier configured for subsequent identification of the multicast and broadcast radio bearer. The method may further include receiving multicast and broadcast service data through the multicast and broadcast radio bearer associated with the second multicast and broadcast service radio bearer identifier.

In accordance with some example embodiments, a computer program product may perform a method. The method may include receiving a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The method may further include associating the multicast and broadcast radio bearer with the second multicast and broadcast service radio bearer identifier configured for subsequent identification of the multicast and broadcast radio bearer. The method may further include receiving multicast and broadcast service data through the multicast and broadcast radio bearer associated with the second multicast and broadcast service radio bearer identifier.

In accordance with certain example embodiments, an apparatus may include at least one processor and at least one memory including computer program code. The at least one memory and the computer program code may be configured to, with the at least one processor, cause the apparatus to at least receive a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The at least one memory and the computer program code may be further configured to, with the at least one processor, cause the apparatus to at least associate the multicast and broadcast radio bearer with the second multicast and broadcast service radio bearer identifier configured for subsequent identification of the multicast and broadcast radio bearer. The at least one memory and the computer program code may be further configured to, with the at least one processor, cause the apparatus to at least receive multicast and broadcast service data through the multicast and broadcast radio bearer associated with the second multicast and broadcast service radio bearer identifier.

In accordance with various example embodiments, an apparatus may include circuitry configured to receive a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier. The circuitry may further be configured to associate the multicast and broadcast radio bearer with the second multicast and broadcast service radio bearer identifier configured for subsequent identification of the multicast and broadcast radio bearer. The circuitry may further be configured to receive multicast and broadcast service data through the multicast and broadcast radio bearer associated with the second multicast and broadcast service radio bearer identifier.

In accordance with some example embodiments, a method may include receiving, by a user equipment, a first radio resource control reconfiguration message configuring the user equipment with a multicast and broadcast radio bearer associated with a first multicast and broadcast service radio bearer identifier. The method may further include receiving, by the user equipment, a second radio resource control reconfiguration message from a network entity comprising the first multicast and broadcast service radio bearer identifier and a second multicast and broadcast service radio bearer identifier associated with the first multicast and broadcast service radio bearer identifier. The method may further include, in response to receiving the second multicast and broadcast service radio bearer identifier, changing, by the user equipment, the multicast and broadcast service radio bearer association from the first multicast and broadcast service radio bearer identifier to the second multicast and broadcast service radio bearer identifier. The method may further include receiving, by the user equipment, multicast and broadcast service data through the multicast and broadcast service radio bearer associated with the second multicast and broadcast service radio bearer identifier.

In accordance with certain example embodiments, an apparatus may include means for receiving a first radio resource control reconfiguration message configuring the user equipment with a multicast and broadcast radio bearer associated with a first multicast and broadcast service radio bearer identifier. The apparatus may further include means for receiving a second radio resource control reconfiguration message from a network entity comprising the first multicast and broadcast service radio bearer identifier and a second multicast and broadcast service radio bearer identifier associated with the first multicast and broadcast service radio bearer identifier. The apparatus may further include means for, in response to receiving the second multicast and broadcast service radio bearer identifier, changing the multicast and broadcast service radio bearer association from the first multicast and broadcast service radio bearer identifier to the second multicast and broadcast service radio bearer identifier. The apparatus may further include means for receiving multicast and broadcast service data through the multicast and broadcast service radio bearer associated with the second multicast and broadcast service radio bearer identifier.

In accordance with various example embodiments, a non-transitory computer readable medium may be encoded with instructions that may, when executed in hardware, perform a method. The method may include receiving a first radio resource control reconfiguration message configuring the user equipment with a multicast and broadcast radio bearer associated with a first multicast and broadcast service radio bearer identifier. The method may further include receiving a second radio resource control reconfiguration message from a network entity comprising the first multicast and broadcast service radio bearer identifier and a second multicast and broadcast service radio bearer identifier associated with the first multicast and broadcast service radio bearer identifier. The method may further include, in response to receiving the second multicast and broadcast service radio bearer identifier, changing the multicast and broadcast service radio bearer association from the first multicast and broadcast service radio bearer identifier to the second multicast and broadcast service radio bearer identifier. The method may further include receiving multicast and broadcast service data through the multicast and broadcast service radio bearer associated with the second multicast and broadcast service radio bearer identifier.

In accordance with some example embodiments, a computer program product may perform a method. The method may include receiving a first radio resource control reconfiguration message configuring the user equipment with a multicast and broadcast radio bearer associated with a first multicast and broadcast service radio bearer identifier. The method may further include receiving a second radio resource control reconfiguration message from a network entity comprising the first multicast and broadcast service radio bearer identifier and a second multicast and broadcast service radio bearer identifier associated with the first multicast and broadcast service radio bearer identifier. The method may further include, in response to receiving the second multicast and broadcast service radio bearer identifier, changing the multicast and broadcast service radio bearer association from the first multicast and broadcast service radio bearer identifier to the second multicast and broadcast service radio bearer identifier. The method may further include receiving multicast and broadcast service data through the multicast and broadcast service radio bearer associated with the second multicast and broadcast service radio bearer identifier.

In accordance with certain example embodiments, an apparatus may include at least one processor and at least one memory including computer program code. The at least one memory and the computer program code may be configured to, with the at least one processor, cause the apparatus to at least receive a first radio resource control reconfiguration message configuring the user equipment with a multicast and broadcast radio bearer associated with a first multicast and broadcast service radio bearer identifier. The at least one memory and the computer program code may be further configured to, with the at least one processor, cause the apparatus to at least receive a second radio resource control reconfiguration message from a network entity comprising the first multicast and broadcast service radio bearer identifier and a second multicast and broadcast service radio bearer identifier associated with the first multicast and broadcast service radio bearer identifier. The at least one memory and the computer program code may be further configured to, with the at least one processor, cause the apparatus to at least, in response to receiving the second multicast and broadcast service radio bearer identifier, change the multicast and broadcast service radio bearer association from the first multicast and broadcast service radio bearer identifier to the second multicast and broadcast service radio bearer identifier. The at least one memory and the computer program code may be further configured to, with the at least one processor, cause the apparatus to at least receive multicast and broadcast service data through the multicast and broadcast service radio bearer associated with the second multicast and broadcast service radio bearer identifier.

In accordance with various example embodiments, an apparatus may include circuitry configured to receive a first radio resource control reconfiguration message configuring the user equipment with a multicast and broadcast radio bearer associated with a first multicast and broadcast service radio bearer identifier. The circuitry may further be configured to receive a second radio resource control reconfiguration message from a network entity comprising the first multicast and broadcast service radio bearer identifier and a second multicast and broadcast service radio bearer identifier associated with the first multicast and broadcast service radio bearer identifier. The circuitry may further be configured to, in response to receiving the second multicast and broadcast service radio bearer identifier, change the multicast and broadcast service radio bearer association from the first multicast and broadcast service radio bearer identifier to the second multicast and broadcast service radio bearer identifier. The circuitry may further be configured to receive multicast and broadcast service data through the multicast and broadcast service radio bearer associated with the second multicast and broadcast service radio bearer identifier.

In accordance with some example embodiments, a method may include receiving, by a target network entity, a handover request from a source network entity, wherein the handover request comprises a first multicast and broadcast service radio bearer identifier and a list comprising at least one quality of service flow identifier associated with the first multicast and broadcast service radio bearer identifier. The method may further include transmitting, by the target network entity within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with certain example embodiments, an apparatus may include means for receiving a handover request from a source network entity, wherein the handover request comprises a first multicast and broadcast service radio bearer identifier and a list comprising at least one quality of service flow identifier associated with the first multicast and broadcast service radio bearer identifier. The apparatus may further include means for transmitting, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with various example embodiments, a non-transitory computer readable medium may be encoded with instructions that may, when executed in hardware, perform a method. The method may include receiving a handover request from a source network entity, wherein the handover request comprises a first multicast and broadcast service radio bearer identifier and a list comprising at least one quality of service flow identifier associated with the first multicast and broadcast service radio bearer identifier. The method may further include transmitting, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with some example embodiments, a computer program product may perform a method. The method may include receiving a handover request from a source network entity, wherein the handover request comprises a first multicast and broadcast service radio bearer identifier and a list comprising at least one quality of service flow identifier associated with the first multicast and broadcast service radio bearer identifier. The method may further include transmitting, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with certain example embodiments, an apparatus may include at least one processor and at least one memory including computer program code. The at least one memory and the computer program code may be configured to, with the at least one processor, cause the apparatus to at least receive a handover request from a source network entity, wherein the handover request comprises a first multicast and broadcast service radio bearer identifier and a list comprising at least one quality of service flow identifier associated with the first multicast and broadcast service radio bearer identifier. The at least one memory and the computer program code may be further configured to, with the at least one processor, cause the apparatus to at least transmit, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with various example embodiments, an apparatus may include circuitry configured to receive a handover request from a source network entity, wherein the handover request comprises a first multicast and broadcast service radio bearer identifier and a list comprising at least one quality of service flow identifier associated with the first multicast and broadcast service radio bearer identifier. The circuitry may further be configured to transmit, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

In accordance with some example embodiments, a method may include determining, by a central unit control plane, to change at least one first multicast and broadcast service radio bearer identifier. The method may further include transmitting, by the central unit control plane, a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The method may further include receiving, by the central unit control plane, a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The method may further include transmitting, by the central unit control plane, a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with certain example embodiments, an apparatus may include means for determining to change at least one first multicast and broadcast service radio bearer identifier. The apparatus may further include means for transmitting a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The apparatus may further include means for receiving a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The apparatus may further include means for transmitting a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with various example embodiments, a non-transitory computer readable medium may be encoded with instructions that may, when executed in hardware, perform a method. The method may include determining to change at least one first multicast and broadcast service radio bearer identifier. The method may further include transmitting a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The method may further include receiving a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The method may further include transmitting a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with some example embodiments, a computer program product may perform a method. The method may include determining to change at least one first multicast and broadcast service radio bearer identifier. The method may further include transmitting a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The method may further include receiving a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The method may further include transmitting a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with certain example embodiments, an apparatus may include at least one processor and at least one memory including computer program code. The at least one memory and the computer program code may be configured to, with the at least one processor, cause the apparatus to at least determine to change at least one first multicast and broadcast service radio bearer identifier. The at least one memory and the computer program code may be further configured to, with the at least one processor, cause the apparatus to at least transmit a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The at least one memory and the computer program code may be further configured to, with the at least one processor, cause the apparatus to at least receive a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The at least one memory and the computer program code may be further configured to, with the at least one processor, cause the apparatus to at least transmit a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with various example embodiments, an apparatus may include circuitry configured to determine to change at least one first multicast and broadcast service radio bearer identifier. The circuitry may further be configured to transmit a F1AP context modification request to a distributed unit comprising a first list of the at least one first multicast and broadcast service radio bearer identifier wherein each first multicast and broadcast service radio bearer identifier is associated with a second multicast and broadcast service radio bearer identifier. The circuitry may further be configured to receive a F1AP context modification response comprising a second list of one or more of at least one of the first multicast and broadcast service radio bearer identifier and the second multicast and broadcast service radio bearer identifier associated with the first multicast and broadcast service radio bearer identifier received in the second list. The circuitry may further be configured to transmit a radio resource control reconfiguration message to a user equipment comprising a third list of one or more of the first multicast and broadcast service radio bearer identifier and the second multicast and broadcast service radio bearer identifier associated with the first multicast and broadcast service radio bearer identifier included in the first list, wherein the third list is determined based upon the second list.

In accordance with some example embodiments, a method may include receiving, by a user equipment, a radio resource control reconfiguration message from a network entity comprising a multicast and broadcast radio bearer wherein the multicast and broadcast radio bearer is identified by a multicast and broadcast service identifier. The method may further include in response to receiving the radio resource control reconfiguration message comprising the multicast and broadcast service identifier, transmitting, by the user equipment, a radio resource control reconfiguration complete message to the network entity. The method may further include receiving, by the user equipment, multicast and broadcast service data through the multicast and broadcast radio bearer identified by the multicast and broadcast service identifier.

In accordance with certain example embodiments, an apparatus may include means for receiving a radio resource control reconfiguration message from a network entity comprising a multicast and broadcast radio bearer wherein the multicast and broadcast radio bearer is identified by a multicast and broadcast service identifier. The apparatus may further include means for, in response to receiving the radio resource control reconfiguration message comprising the multicast and broadcast service identifier, transmitting a radio resource control reconfiguration complete message to the network entity. The apparatus may further include means for receiving multicast and broadcast service data through the multicast and broadcast radio bearer identified by the multicast and broadcast service identifier.

In accordance with various example embodiments, a non-transitory computer readable medium may be encoded with instructions that may, when executed in hardware, perform a method. The method may include receiving a radio resource control reconfiguration message from a network entity comprising a multicast and broadcast radio bearer wherein the multicast and broadcast radio bearer is identified by a multicast and broadcast service identifier. The method may further include, in response to receiving the radio resource control reconfiguration message comprising the multicast and broadcast service identifier, transmitting a radio resource control reconfiguration complete message to the network entity. The method may further include receiving multicast and broadcast service data through the multicast and broadcast radio bearer identified by the multicast and broadcast service identifier.

In accordance with some example embodiments, a computer program product may perform a method. The method may include receiving a radio resource control reconfiguration message from a network entity comprising a multicast and broadcast radio bearer wherein the multicast and broadcast radio bearer is identified by a multicast and broadcast service identifier. The method may further include, in response to receiving the radio resource control reconfiguration message comprising the multicast and broadcast service identifier, transmitting a radio resource control reconfiguration complete message to the network entity. The method may further include receiving multicast and broadcast service data through the multicast and broadcast radio bearer identified by the multicast and broadcast service identifier.

In accordance with certain example embodiments, an apparatus may include at least one processor and at least one memory including computer program code. The at least one memory and the computer program code may be configured to, with the at least one processor, cause the apparatus to at least receive a radio resource control reconfiguration message from a network entity comprising a multicast and broadcast radio bearer wherein the multicast and broadcast radio bearer is identified by a multicast and broadcast service identifier. The at least one memory and the computer program code may be further configured to, with the at least one processor, cause the apparatus to at least, in response to receiving the radio resource control reconfiguration message comprising the multicast and broadcast service identifier, transmit a radio resource control reconfiguration complete message to the network entity. The at least one memory and the computer program code may be further configured to, with the at least one processor, cause the apparatus to at least receive multicast and broadcast service data through the multicast and broadcast radio bearer identified by the multicast and broadcast service identifier.

In accordance with various example embodiments, an apparatus may include circuitry configured to receive a radio resource control reconfiguration message from a network entity comprising a multicast and broadcast radio bearer wherein the multicast and broadcast radio bearer is identified by a multicast and broadcast service identifier. The circuitry may further be configured to, in response to receiving the radio resource control reconfiguration message comprising the multicast and broadcast service identifier, transmit a radio resource control reconfiguration complete message to the network entity. The circuitry may further be configured to receive multicast and broadcast service data through the multicast and broadcast radio bearer identified by the multicast and broadcast service identifier.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for changing MRB IDs without requiring release, is not intended to limit the scope of certain example embodiments, but is instead representative of selected example embodiments.

Currently, legacy behavior includes a multicast and broadcast service (MBS) radio resource control (RRC) assuming (for both data radio bearers (DRB) and MRB) that, if a user equipment (UE) receives an RRCReconfiguration message with a new DRB/MRB ID, the UE assumes it to be a new DRB/MRB, and a new packet data convergence protocol (PDCP) for the DRB/MRB may be established. Thus, the DRB/MRB ID may not be changed for an existing DRB or MRB via RRC reconfiguration (e.g., during handover (HO)). This may avoid some disadvantages with DRB since the DRB ID is UE-specific and, therefore, the same DRB ID may be used for both source and target gNBs, even when PDCP re-establishment is desired during handover. From the perspective of the UE, the same DRB may be used throughout the HO procedure (i.e., the same PDCP entity of the DRB in the UE may be maintained during the HO). Furthermore, since the DRB ID may be used as an input parameter for security (i.e., encryption and integrity protection), the DRB ID may only be changed by releasing the DRB and adding a new DRB (i.e., release and add). This procedure may ensure that only one security is used for a DRB at a time, but may also establish a new PDCP entity, and, thus, result in service interruption. For DRB, the DRB ID may be changed by modifying the RRCReconfiguration message to include DRB-ToReleaseList (i.e., the old DRB ID is released) and DRB-ToAddModList (i.e., the new DRB ID is added). This may remove the old DRB, and add a new DRB associated the new DRB ID.

For a MRB using point-to-multipoint (PTM) transmissions, it may be impossible to keep the same MRB ID during HO since the MRB ID is not UE-specific, and neighbouring cells may already use different IDs for the same MBS services and/or use the MRB ID for a DRB (if the ID space is shared). There may also be no coordination between gNBs when selecting IDs for DRBs and MRBs. For example, when a UE moves from one cell to another cell, and wants to continue receiving a multicast service without service interruption, the network may use the same ID for the MRB conveying the same service in all cells. This, however, may not always be possible, e.g., if there is no coordination between the cells. If a RRCReconfiguration message includes a new MRB ID (e.g., a HO command (including MRB-ToAddModList)), the UE may establish a new MRB with new PDCP entity, and the MBS service may be interrupted.

Figure 1:
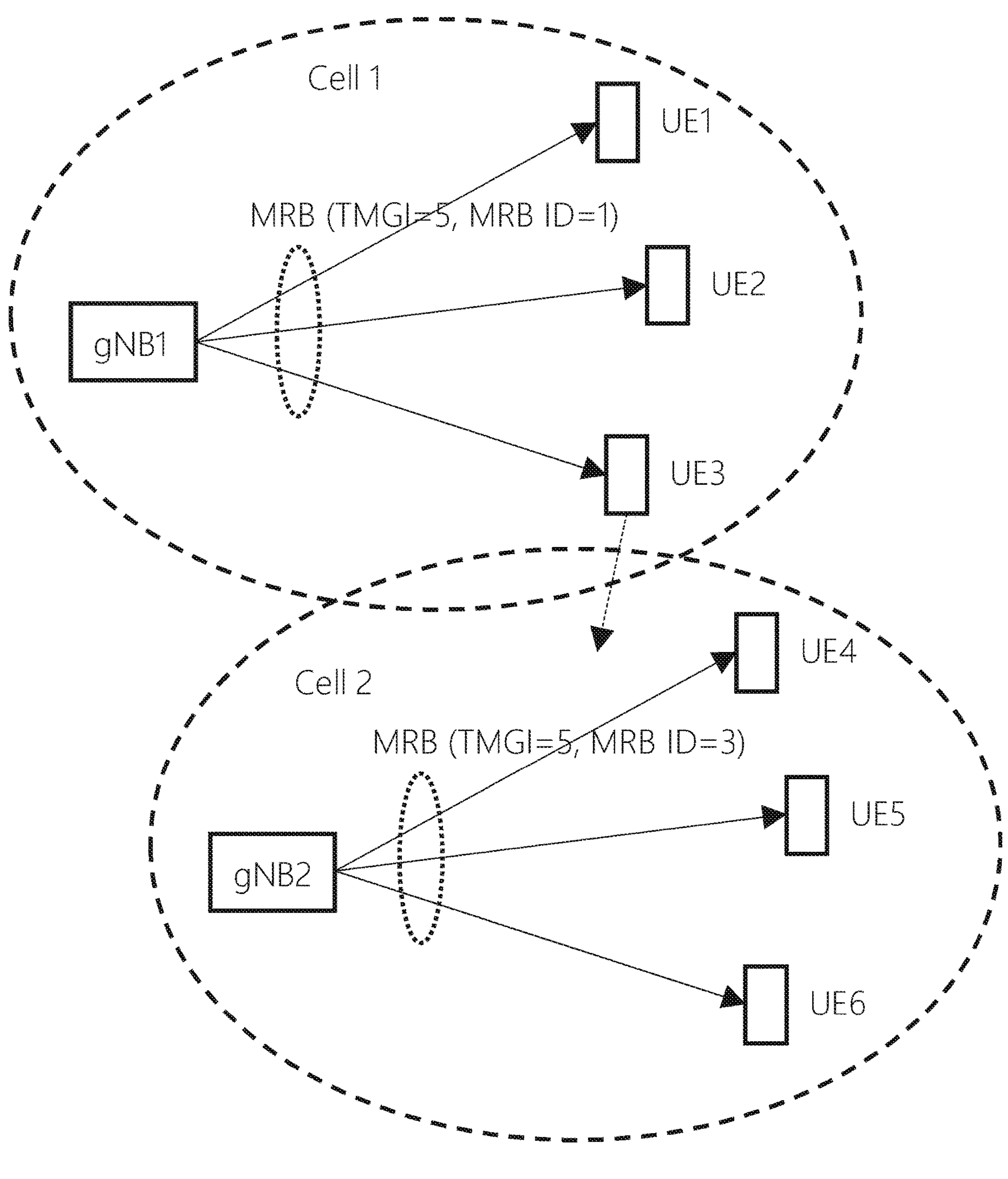
FIG. 1 illustrates an example of different MRB IDs used in different cells for the same multicast and broadcast service.

FIG. 1 illustrates an example of handover procedures when MBS is used (i.e., MRB configured). The MBS service may already be active in both source (gNB1) and target (gNB2) cells, but may use different MRB IDs in different cells. Thus, a MRB ID change may be necessary for a UE moving during HO. Specifically, in cell 1, gNB1 may use MRB ID=1 for delivering the MBS service to several UEs (UE1, UE2, UE3) with temporary mobile group identity (TMGI)=5 (i.e., MBS service ID). Similarly, in cell 2, gNB2 may use MRB ID=3 to deliver the same MBS service to several UEs (UE4, UE5, UE6) with TMGI=5. If UE3 moves from cell 1 to cell 2, and wants to continue receiving the MBS service with MBS service ID TMGI=5, the UE should be configured with a new MRB ID. As a result, the UE would need to establish a new MRB, and the service may be interrupted. Since DRB is UE-specific, the DRB ID may be retained throughout HO (i.e., there may be no need for a DRB ID change in HO).

To change DRB IDs, by RRC reconfiguration, DRB ID may only be changed by releasing the DRB, and adding a new DRB with a new DRB ID. Different MRB IDs could be allowed for different UEs for the same MRB. However, this would only be possible when dedicated RRC signaling is used. If group RRC signaling were used for reconfiguration of MRB PTM-leg, the same MRB ID would need to be configured to all UEs within a cell.

Certain example embodiments described herein may have various benefits and/or advantages to overcome the disadvantages described above. For example, certain example embodiments may enable changing a MRB ID without release and adding of the corresponding MRB. Thus, certain example embodiments discussed below are directed to improvements in computer-related technology.

As will be discussed in further detail below, some example embodiments may relate to changing MRB ID with RRC reconfiguration without release and add of a corresponding MRB. For example, for MRB, changing MRB ID may be possible since no security is used for multicast transmission. In this way, MRB ID may be an index of the MBS radio bearer. Additionally, various example embodiments for changing MRB ID without release/add of corresponding MRB may be determined by a target gNB during a handover procedure based upon a MBS QoS flow-MRB mapping sent by a source gNB for the MRB.

Furthermore, certain example embodiments may be based upon F1-interface aspects, including signaling added over F1-interface to enable modification of MRB IDs without release/add of the MRB. F1 interface may be a network interface between gNB-CU and gNB-DU or CU and DU for short. In addition, some example embodiments may include expanding the MRB ID space to be as large as the MBS service ID (e.g., TMGI), and may use the MBS service ID in RAN as a MRB ID. As a result, according to certain example embodiments, the same MRB ID may be used throughout the network to provide MBS service.

In various example embodiments, optional PDCP SN continuity may be specified for UM MRBs for PDCP re-establishment. Different cells may use different MRB IDs for the same MRB sessions. Currently, DRB/MRB ID may be changed only via release and add, i.e., in HO by releasing the source MRB and adding a new MRB for the target. The drawback of this is that PDCP may be reset, and lossless handover without duplicates cannot be guaranteed. Therefore, some example embodiments enable changing MRB ID for an MRB without releasing and adding a new MRB. This is possible since for the MRB, the MRB ID may be an index, rather than being used as an input parameter for security. Specifically, certain example embodiments may Allow MRB ID changes for MRBs without release and add in order to avoid MRB ID coordination between cells. For example, this may be specified simply by adding a new MRB-Identity into MRBToAddMod. Furthermore, since the mapping of the MBS QoS flows to MRBs may be different in different cells, the HO Request message may also indicate the mapping of MBS QoS flows to MRBs. The target gNB may need this mapping to know which MRBs can continue in the target cell. In other example embodiments, a HO Request message may indicate the mapping of MBS QoS flows to MRBs which is not part of the UE configuration.

Figure 2:
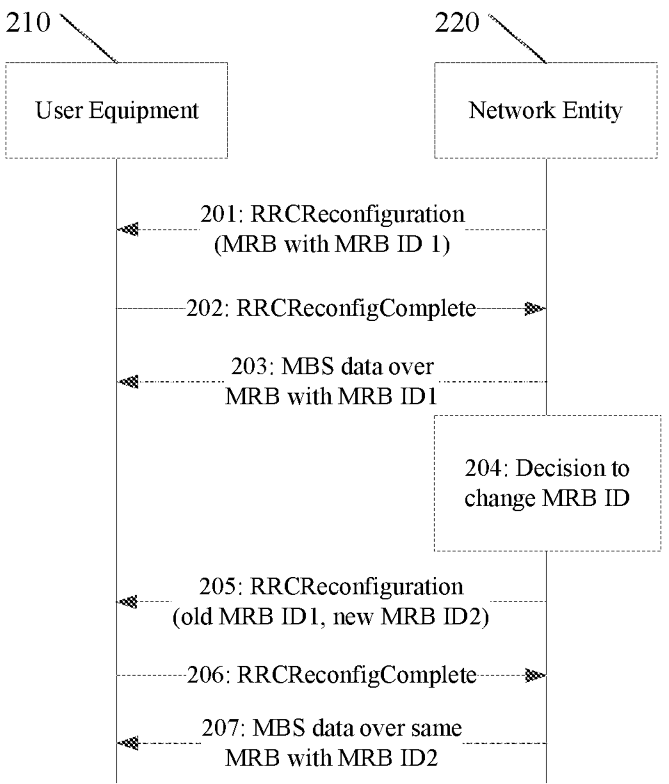
FIG. 2 illustrates a signaling diagram according to certain example embodiments.
Figure 15:
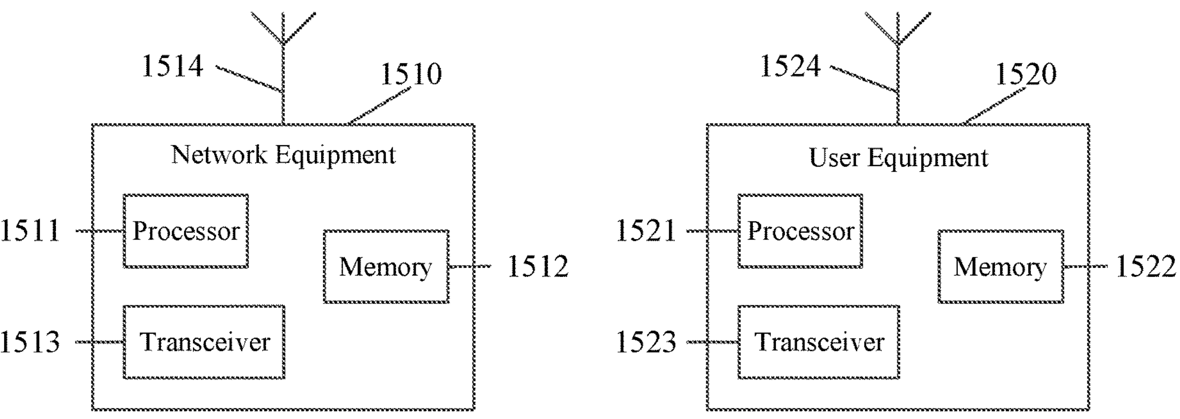
FIG. 15 illustrates an example of various network devices according to some example embodiments.

FIG. 2 illustrates an example of a signaling diagram depicting changing a MRB ID with a UE. In the example of FIG. 2, UE 210 may be similar to UE 1520, and NE 220 may be similar to NE 1510, as illustrated in FIG. 15 discussed below, according to certain example embodiments. UE 210 may be configured with the MBS service with one MRB with MRB ID1. UE may be configured with multiple MRBs each identified by an MRB ID. While only one MRB is depicted in FIG. 2, any number of MRB may be involved.

At 201, NE 220 may transmit to UE 210 a MRB-ToAddMod in a RRCReconfiguration message. At 202, in response to the received RRCReconfiguration message (including the MRB-ToAddMod), UE 210 may transmit to NE 220 a RRCReconfigurationComplete message. At 203, NE 220 may begin to transmit MBS data over MRB with MRB ID1 to UE 210.

At 204, NE 220 may decide to change a MRB ID, and at 205, NE 220 may transmit to UE 210 another RRCReconfiguration message (which may be a reconfiguration within a cell, or may be, e.g., a HO command to change the cell) reconfiguring UE 210. In this RRCReconfiguration message, MRB-ToAddMod may indicate both the old MRB ID used earlier (MRB ID1) and the new MRB ID to be used (MRB ID2), thus changing the MRB ID without release and add (i.e., without releasing the MRB and adding a new MRB). Thus, the MRB ID may change while the MRB remains the same. Retaining the same MRB implies that the PDCP entity for the MRB may be kept in the UE (i.e., the same PDCP entity may be used for DL data reception before and after the MRB ID change). An MRB and the PDCP entity configured for the MRB are closely related: if MRB is released, it is similar to the associated PDCP entity being released, and when a new MRB is added, a new PDCP entity may be established and associated with the MRB. For example, the information element (IE) mrb-Identity may be used for the old MRB ID, and a new information element mrb_IdentityNew may be introduced for the new MRB ID. Both parameters may be included, for example, into MRB-ToAddMod, and may be configured similar to:

```
MRB-ToAddMod-r17 ::=     SEQUENCE {
   tmgi-r17               TMGI-r17                  OPTIONAL, -- Cond MRBSetup
   mrb-Identity-r17       MRB-Identity-r17,
   mrb-IdentityNew-r17    MRB-Identity-r17          OPTIONAL, -- Need N
   reestablishPDCP-r17    ENUMERATED{true}          OPTIONAL, -- Need N
   recoverPDCP-r17        ENUMERATED{true}          OPTIONAL, -- Need N
   pdcp-Config-r17        PDCP-Config               OPTIONAL, -- Cond PDCP
   ...
}
```

At 206, UE 210 may transmit to NE 220 a RRCReconfigurationComplete message. If the RRCReconfiguration message at 205 is a HO command, then the RRCReconfigurationComplete at 206 may be sent to a target NE (also similar to NE 1510 illustrated in FIG. 15). At 207, NE 220 may transmit to UE 210 the MBS data over the same MRB with new MRB ID2. In comparison to legacy where if MRB ID changes, the UE would release the MRB and establish a new MRB, in some example embodiments, UE 210 may continue to use the same MRB.

Figure 3:
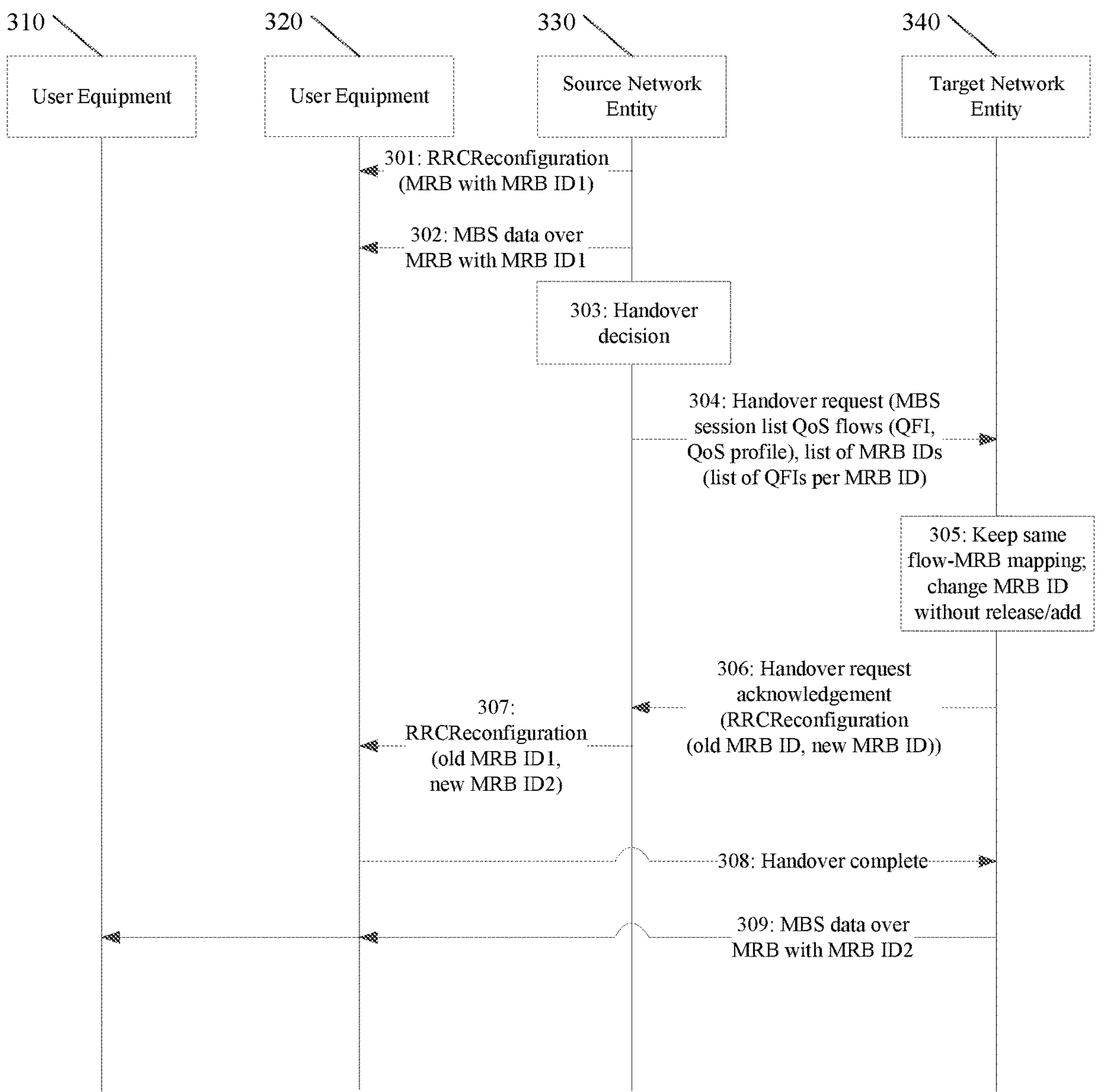
FIG. 3 illustrates another signaling diagram according to some example embodiments.

FIG. 3 illustrates an example of a signaling diagram depicting changing a MRB ID with a RRCReconfiguration message by adding a field, such as 'mrb-IdentityNew,' into MRB-ToAddMod, according to an example embodiment. In this way, allowing MRB ID changes may simplify network deployments since MRB ID coordination between the cells becomes unnecessary. In the example of FIG. 3, UE 310 and UE 320 may be similar to UE 1520, and source NE 330 and target NE 340 may be similar to NE 1510, as illustrated in FIG. 15 discussed below, according to certain example embodiments. UE 320 may be configured with an MBS service in source NE 330; for example, MRB ID1 may be configured for UE 320. UE 320 may initially be connected to source NE 330, and after HO it connects to target NE 340, UE 310 may be assumed to be connected to target NE 340.

At 301, source NE 330 may transmit to UE 320 an RRCReconfiguration message, which may include MRBs associated with MRB IDs (e.g., MRB1 associated with MRB ID1). For example, the RRCReconfiguration message may include a MRB-ToAddMod with a parameter, such as 'MRB-Identity.'

At 302, source NE 330 may transmit to UE 320 (and other UEs not shown in the figure) MBS data over the MRB associated with MRB ID (configured MRB with MRB ID1).

At 303, source NE 330 may perform a handover decision to move UE 320 to another cell.

At 304, source NE 330 may transmit handover requests to target NE 340. The handover requests may include an MBS session list of quality of service (QoS) flows and the corresponding MRB ID(s). For example, the MBS session list may include QoS flow identifiers (QFI), QoS profiles, and the list of MRB IDs transmitted at 302 (i.e., list of QFIs per MRB ID).

At 305, target NE 340 may decide to keep the same flow-MRB mapping, and may change MRB ID(s) without release/add.

At 306, target NE 340 may transmit a handover request acknowledgement to source NE 330. In various example embodiments, the handover request acknowledgement may include an RRCReconfiguration message with the old and new MRB IDs. For example, the IE mrb-Identity may be used for the old MRB ID, and a new parameter mrb_IdentityNew may be introduced for the new MRB ID. Both parameters may be included, for example, into MRB-ToAddMod and may be configured similar to:

```
MRB-ToAddMod-r17 ::=        SEQUENCE {
  tmgi-r17                  TMGI-r17              OPTIONAL, -- Cond MRBSetup
  mrb-Identity-r17          MRB-Identity-r17,
  mrb-IdentityNew-r17       MRB-Identity-r17      OPTIONAL, -- Need N
  reestablishPDCP-r17       ENUMERATED{true}      OPTIONAL, -- Need N
  recoverPDCP-r17           ENUMERATED{true}      OPTIONAL, -- Need N
  pdcp-Config-r17           PDCP-Config           OPTIONAL, -- Cond PDCP
  ...
}
```

The new parameter may only be allowed when certain security, i.e., encryption and integrity protection, is disabled for the MRB. In particular, multicast MRB addition/modification may specify that the UE may, for each mrb-Identity value included in the mrb-ToAddModList that is not part of the current UE configuration (multicast MRB establishment including the case when full configuration option is used), establish a PDCP entity and configure it in accordance with the received pdcp-Config. This shows that if the existing parameter mrb-Identity were used for changing the MRB ID, then the UE would establish a new MRB, not modify an existing MRB. If the multicast MRB was configured with the same tmgi prior to receiving this reconfiguration, the established multicast MRB may be associated with the corresponding tmgi. Otherwise, the establishment of the multicast MRB(s) and the tmgi of the established multicast MRB(s) may be indicated to upper layers. If an SDAP entity with the received tmgi does not exist, an SDAP entity may be established as specified in 3GPP TS 37.324, version 16.3.0, clause 5.1.1. In some example embodiments, the RRC procedure may be amended such that for each mrb-Identity value included in the mrb-ToAddModList that is part of the current UE configuration, if the mrb-IdentityNew is included, the MRB Identity of this MRB may be changed to new MRB Identity indicated by mrb-IdentityNew. With this addition and addition of the new parameter mrb-IdentityNew, the MRB ID of an already established MRB may be changed without first releasing the MRB and then adding it with the new MRB ID. Furthermore, if the reestablishPDCP is set, and if drb-ContinueROHC is included in pdcp-Config, the lower layer may be indicated that drb-ContinueROHC is configured. If drb-ContinueEHC-DL is included in pdcp-Config, the lower layer may be indicated that drb-ContinueEHC-DL is configured. The PDCP entity of this multicast MRB may be re-established as specified in TS 38.323, version 16.6.0, clause 5.1.2. If the pdcp-Config is included, the PDCP entity may be reconfigured in accordance with the received pdcp-Config. When setting the reestablishPDCP flag for a radio bearer, the network may ensure that the RLC receiver entities do not deliver old PDCP PDUs to the re-established PDCP entity. It may do that e.g., by triggering a reconfiguration with sync of the cell group hosting the old RLC entity or by releasing the old RLC entity. The UE configuration may refer to the parameters configured by NR RRC unless otherwise stated.

At 307, source NE 330 may transmit to UE 320 a handover command, such as a RRCReconfiguration message, with the old and new MRB IDs, indicated as described above, to reconfigure UE 320. In certain example embodiments, MRB-ToAddMod in the handover command (RRCReconfiguration message) may indicate both the old MRB ID (mrb-Identity) used in source NE 330 (MRB ID1) and the new MRB ID (mrb-IdentityNew) to be used in target NE 340 (MRB ID2), thus changing the MRB ID without release and add.

At 308, UE 320 may transmit to target NE 340 a handover complete message, such as RRCReconfigurationComplete. At 309, target NE 340 may transmit to UE 320 and to other UEs connected to target NE 340, such as UE 310, MBS data over MRB with the MRB ID2.

FIG. 3 further illustrates that UE 320 may receive MRB-ToAddMod in RRCReconfiguration message 301 from source NE 330 (e.g., gNB). First, the UE may be configured with the MBS service in the source cell (MRB ID1 is configured for the UE). UE 320 may then receive, at 302, MBS data over the configured MRB with MRB ID1. When UE moves to another cell, a HO command (RRCReconfiguration message), the message received at 307 by UE 320 may reconfigure the UE. In this RRCReconfiguration message at 307 (HO command), MRB-ToAddMod may indicate both the old MRB ID (mrb-Identity) used in source cell (MRB ID1) and the new MRB ID (mrb-IdentityNew) to be used in the target cell (MRB ID2), thus changing the MRB ID without release and add. UE 320 may then send the HO complete message at 308 (RRCReconfigurationComplete), and start receiving the MBS data at 309 over MRB with MRB ID2 from the target NE (e.g., gNB).

Figure 4:
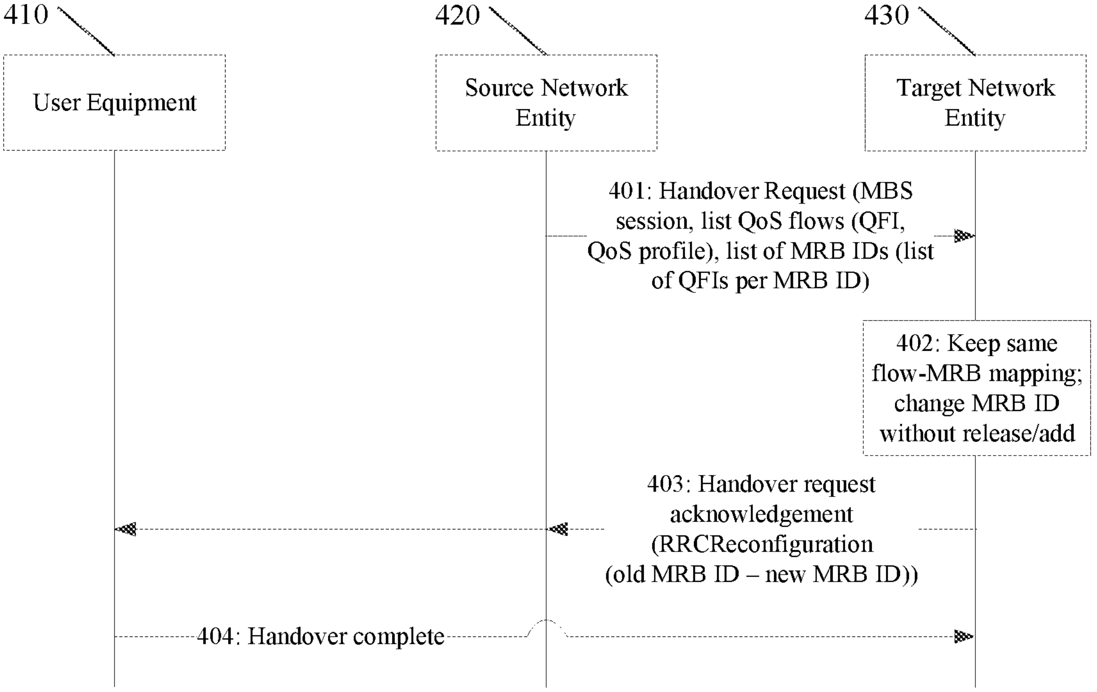
FIG. 4 illustrates another signaling diagram according to various example embodiments.

FIG. 4 illustrates a signaling diagram depicting an example for changing a MRB ID with $X_n$ interface aspects, according to an example embodiment. In the example of FIG. 4, UE 410 may be similar to UE 1520, and source NE 420 and target NE 430 may be similar to NE 1510, as illustrated in FIG. 15 discussed below, according to certain example embodiments. The decision that triggers the change of the MRB ID without release/add of corresponding MRB, at target NE 430 involved in a UE mobility, may be the compatibility with the flow-MRB mapping received from source NE 420 during a handover.

At 401, source NE 420 may transmit a handover request message to target NE 430 via an $X_n$ interface. The handover request message may indicate current MBS QoS flows to MRB mapping for all MRBs of source NE 420. The handover request message may be configured to notify target NE 430 of a configuration used in source NE 420 (i.e., MRB IDs used for UE 410, as well as MBS QoS flows mapped to each MRB).

If the MBS QoS flow mapping to MRB in target NE 430 matches the MBS QoS flow mapping in source NE 420, but target NE 430 uses different MRB IDs for those MRBs, then MRB IDs may be changed, as discussed above; however, if the MBS QoS flow mapping is different, other procedures may be used. Table 1 below provides an example mapping of MRBs (MRB IDs) to MBS QoS flows in source NE 420 and target NE 430 for when target NE 430 decides to continue the same MRBs (same PDCP entity) in UE 410 after the handover, but has to change the MRB ID(s):

TABLE 1

Example mapping of MRBs (MRB IDs) to MBS QoS flows

| Source NE 420 | | Target NE 430 | |
|---|---|---|---|
| MRB ID | MBS QoS flows mapped to MRB | MRB ID | MBS QoS flows mapped to MRB |
| 1 | MBS Service ID = 1, QFI = 1 | 1 | MBS Service ID = 2, QFI = 1 |
| 2 | MBS Service ID = 1, QFI = 2 | 2 | MBS Service ID = 1, QFI = 1 |
| 3 | MBS Service ID = 2, QFI = 1 | 3 | MBS Service ID = 1, QFI = 2 |

First, QoS flow (QFI=1) of MBS service 1 (MBS Service ID=1) may be mapped to MRB with MRB ID=1 in source NE 420, but to MRB ID=2 in target NE 430; and second QoS flow (QFI=2) of the same service (MBS Service ID=1) may be mapped to MRB with MRB ID=2 in source NE 420 and to MRB ID=3 in target NE 430. Finally, the QoS flow (QFI=1) of MBS service 2 (MBS Service ID=2) may be mapped to MRB ID=3 in source NE 420 and MRB ID=1 in target NE 430. As a result, the MRB to MBS QoS flow mapping may match in source NE 420 and target NE 430, but different MRB IDs may be used in source NE 420 and target NE 430.

When UE 410 performs handover from source NE 420 to target NE 430, each MRB may continue in target NE 430 when the MRB IDs for each MRB are changed; specifically, for the first MRB, MRB ID may be changed from source MRB ID=1 to target MRB ID=2; for the second MRB from source MRB ID=2 to target MRB ID=3; and for the third MRB from source MRB ID=3 to target MRB ID=1.

Table 2 below provides another example mapping of MRBs (MRB IDs) to MBS QoS flows in source NE 420 and target NE 430.

TABLE 2

Example mapping of MRBs (MRB IDs) to MBS QoS flows

| Source NE 420 | | Target NE 430 | |
|---|---|---|---|
| MRB ID | MBS QoS flows mapped to MRB | MRB ID | MBS QoS flows mapped to MRB |
| 1 | MBS Service ID = 1, QFI = 1<br>MBS Service ID = 1, QFI = 2 | 1 | MBS Service ID = 2, QFI = 1 |
| 2 | MBS Service ID = 2, QFI = 1 | 2 | MBS Service ID = 1, QFI = 1<br>MBS Service ID = 1, QFI = 2 |

In this example, MBS service 1 (MBS Service ID=1) (both QoS flows) may be mapped to MRB with MRB ID=1 in source NE 320, and to MRB with MRB ID=2 in target NE 430. Similarly, MBS service 2 (MBS Service ID=2) may be mapped to MRB ID=2 in source NE 420, and to MRB ID=1 in target NE 430. The result is that the MRB to MBS QoS flow mapping matches in both source NE 420 and target NE 430, but different MRB IDs may be used in source NE 420 and target NE 430.

In certain example embodiments, when UE 410 performs handover from source NE 420 to target NE 430, both MRBs may continue in target NE 430, but the MRB IDs need to be changed; for example, in this case, they need to be swapped.

In MBS HO, UE 410 may be configured with MRBs of target NE 430, such that the MRBs initially only have point-to-point (PTP)-leg. When PTP transmissions for UE 410 are in sync with the PTM transmissions, UE 410 may be reconfigured to receive the PTM transmissions. Since the PTP transmission is targeted only for a single UE (UE 410), an MRB with PTP-leg only may be configured with any MRB ID. In certain example embodiments, UE 410 may be configured with the final MRB ID already in the HO command, and the later RRC reconfiguration may not require changing the MRB ID when adding the PTM leg to the MRB.

In some example embodiments, target NE 430 may keep the source cell MRB IDs in the HO command when configuring the target cell MRBs with PTP legs only, and change the MRB IDs to those used in target NE 430 when reconfiguring UE 410 to also receive the PTM transmission. In this case, the MRB ID change would occur after the handover. An example of changing MRB ID without HO in case, when using split network architecture with CU/DU split and CU-CP/CU-UP split, will be discussed below with respect to FIG. 5.

At 402, upon receiving the MBS QoS flows-MRB mapping list from source NE 420, target NE 430 may determine that target NE 430 can reuse the configuration without releasing/adding MRBs (e.g., the same QoS flows may be mapped to an MRB), and may revise the MRB ID to take into account the identifiers used at target NE 430 by the equivalent MRBs.

At 403, target NE 430 may transmit a RRC reconfiguration (i.e., RRC handover command) to UE 410 piggybacked in an $X_n$ handover request acknowledgement message. For example, the RRC reconfiguration message may indicate to UE 410 the change of MRB IDs for current MRBs.

At 404, UE 410 may transmit a handover complete message to target NE 430. When UE 410 accesses target NE 430, UE 410 may have the MRB configuration, which may be compatible with the MRB IDs used at target NE 330.

Figure 5:
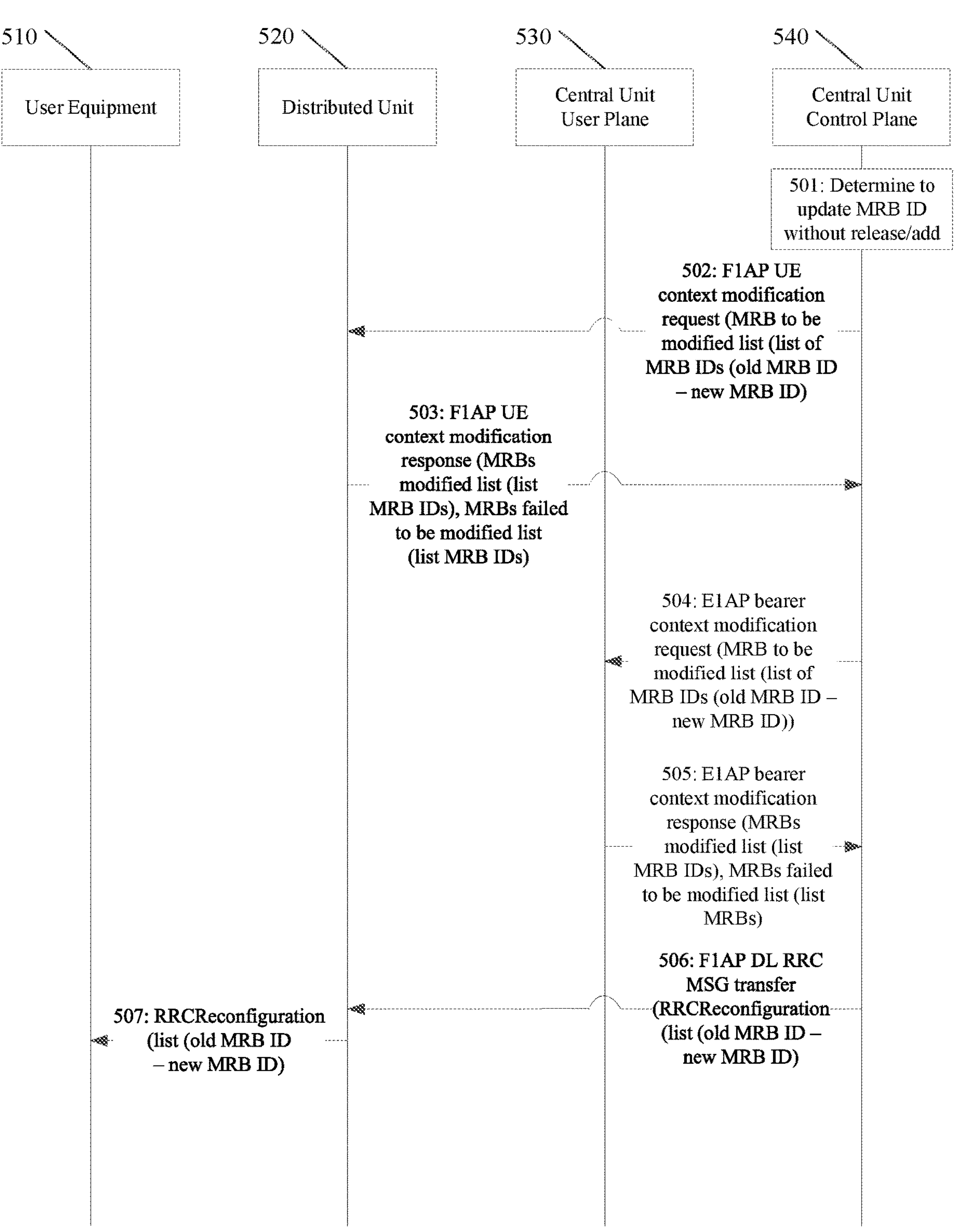
FIG. 5 illustrates another signaling diagram according to certain example embodiments.

FIG. 5 illustrates a signaling diagram depicting an example for changing a MRB ID with F1/E1 aspects, according to an example embodiment. F1 may be the interface between a CU and a DU, and E1 may be the interface between a CU-CP and CU-UP. In the example of FIG. 5, UE 510 may be similar to UE 1520, and DU 520, CU UP 530, and CU CP 540 may be similar to NE 1510, as illustrated in FIG. 15 discussed below, according to certain example embodiments.

As discussed above regarding FIG. 3, a MRB ID may need to be changed in handover when different cells use different MRB IDs. If changing MRB IDs is allowed, then MRB IDs could also be changed without handover. In contrast, FIG. 5 illustrates an example for changing MRB ID without HO (i.e., changes required to F1 and E1 signalling). CU CP 540 may decide to change MRB ID for any reason (up to implementation). For example, a target gNB may keep the source MRB IDs in the HO command when configuring the target MRBs with PTP legs only and change the MRB IDs to those used in the target cell when reconfiguring UE 510 to also receive PTM transmissions. In this case, MRB ID changes may occur after handover. CU CP 540 may decide to change the MRB IDs without release/add. CU CP 540 may then need to keep CU UP 530 and DU 520 involved in the radio protocol layers of these MRBs of the new identities used for the MRBs.

At 501, CU CP 540 may decide to update the MRB identities without releasing/adding the MRBs. At 502, CU CP 540 may send, e.g., an F1AP UE Context Modification Request message to DU 520 including the list of MRB IDs for which the change is needed and for each MRB ID to be updated the (old MRB ID-new MRB ID) pair. In some example embodiments, Table 3 below shows how the F1AP UE Context Modification Request message may be amended, as underlined below:

TABLE 3

F1AP UE Context Modification Request message configuration

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16]. For handover case, this IE is considered as target cell. | YES | ignore |
| MRB to Be Modified Fist | | 0 . . . 1 | | | YES | reject |
| >MRB to Be Modified Item IEs | | 1 . . . <maxnoofMRBs> | | | EACH | Reject |
| >>old MRB ID | M | | 9.3.1.xx | | — | |
| >>new MRB ID | M | | 9.3.1.xx | | — | |

At 503, DU 520 may reply to CU CP 540 indicating which MRB identities may and may not be successfully changed. For example, a F1AP UE context modification response may be sent to CU CP 540 indicating a MRBs modified list (list MRB IDs) and MRBs failed to be modified list (list MRB IDs). In addition, DU may include in the F1AP UE context modification response CellGroupConfig, which may include the new MRB ID to logical channel identity (LCID) mapping. The mapping may be configured by releasing the old RLC bearer associated with the old MRB ID, and adding a new RLC bearer associated with the new MRB ID. At 504, CU CP 540 may send, for example, an E1AP Bearer Context Modification Request message to CU UP 530 including the list of MRB IDs for which the change is needed and for each MRB ID to be updated the (old MRB ID-new MRB ID) pair. In various example embodiments, the information element (IE) shown in Table 4 below contains protocol data unit (PDU) session resource to modify related information used at Bearer Context Modification Request.

TABLE 4

PDU Session Resource To Modify List

| IE/Group Name | Presence | Range | IE type and reference | Semantics description | Criticality | Assigned Criticality |
|---|---|---|---|---|---|---|
| PDU Session Resource To Modify Item | | 1 . . . <maxnoofPDUSessionResource> | | | — | — |
| >PDU Session ID | M | | 9.3.1.21 | | — | — |
| >Security Indication | O | | 9.3.1.23 | This IE is not used in this release. | — | — |
| >MRB To Modify List | | 0 . . . 1 | | | — | — |
| >>MRB To Modify Item | | 1 . . . <maxnoofMRBs> | | | — | — |

TABLE 4-continued

| PDU Session Resource To Modify List | | | | | | |
|---|---|---|---|---|---|---|
| IE/Group Name | Presence | Range | IE type and reference | Semantics description | Criticality | Assigned Criticality |
| >>>old MRB ID | M | | 9.3.1.yy | | — | — |
| >>>new MRB ID | O | | 9.3.1.yy | | — | — |

At 505, CU UP 530 may reply to CU CP 540 indicating which MRB identities could be successfully changed, and which could not. For example, CU UP 530 may send a E1AP bearer context modification response indicating a MRBs modified list (list MRB IDs) and MRBs failed to be modified list (list MRB IDs).

At 506, CU CP 540 may send UE 510 an RRC reconfiguration message (similar to FIG. 3) to inform UE 510 about the MRB IDs which could be changed successfully. The RRC message may be sent from CU CP 540 to DU 520, for example, encapsulated into a F1AP DL RRC MSG transfer message. Subsequently, DU 520 may then transmit the encapsulated RRC message to UE 510. In response, UE 510 may apply indicated changes.

Figure 6:
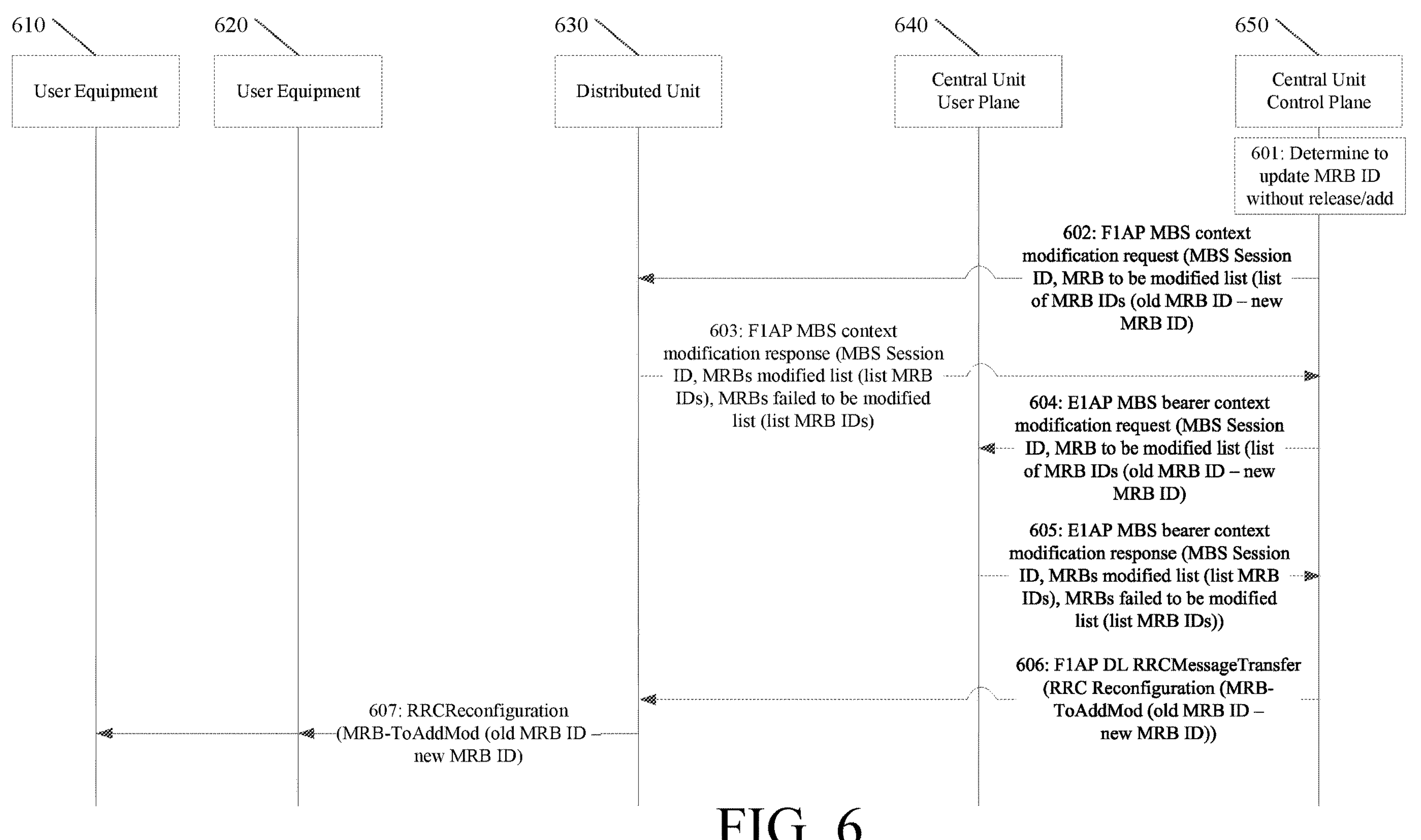
FIG. 6 illustrates another signaling diagram according to some example embodiments.

FIG. 6 illustrates a signaling diagram depicting an example for changing a MRB ID with F1/E1 aspects, according to an example embodiment. In the example of FIG. 6, UE 610 and 620 may be similar to UE 1520, and DU 630, CU UP 640, and CU CP 650 may be similar to NE 1510, as illustrated in FIG. 15, according to certain example embodiments.

As illustrated in the example of FIG. 6, at 601, CU CP 650 may determine to update an MRB ID without release/add for multiple UEs. At 602, CU CP 650 may transmit, for example, a non-UE associated message F1AP MBS Context Modification Request to DU 630. The request may include an MBS Session ID and MRB to be modified list (i.e., list of MRB IDs (old MRB ID-new MRB ID). The MRB ID change may then apply to all UEs receiving the MRB. Alternatively, UE-associated FLAP signalling could be used, for example, FLAP UE Context Modification Request. In that case, it may be specified that MRB ID change configured for one UE should be applied to all UEs receiving that MRB.

At 603, DU 630 may transmit to CU CP 650, for example, a FLAP MBS context modification response. For example, the response may include MBS Session IDs and MRBs modified list (i.e., list MRB IDs), and MRBs failed to be modified list (list MRB IDs). At 604, CU CP 650 may transmit to CU UP 640 an E1AP MBS bearer context modification request, which may include an MBS Session ID and MRB to be modified list (list of MRB IDs (old MRB ID-new MRB ID)).

At 605, CU UP 640 may transmit to CU CP 650 an E1AP MBS bearer context modification response, which may include an MBS Session ID, MRBs modified list (list MRB IDs), and MRBs failed to be modified list (i.e., list MRB IDs). At 606, CU CP 650 may transmit to DU 630 a F1AP DL RRCMessageTransfer, which may include RRC Reconfiguration (i.e., MRB-ToAddMod (old MRB ID-new MRB ID)). In this case, the FLAP DL RRCMessageTransfer message may be a non-UE associated message since the encapsulated RRC message is a group RRC message intended to a group of UEs.

At 607, DU 630 may transmit to UE 610 and UE 620 a group RRCReconfiguration message (i.e., MRB-ToAddMod (old MRB ID-new MRB ID).

Figure 7:
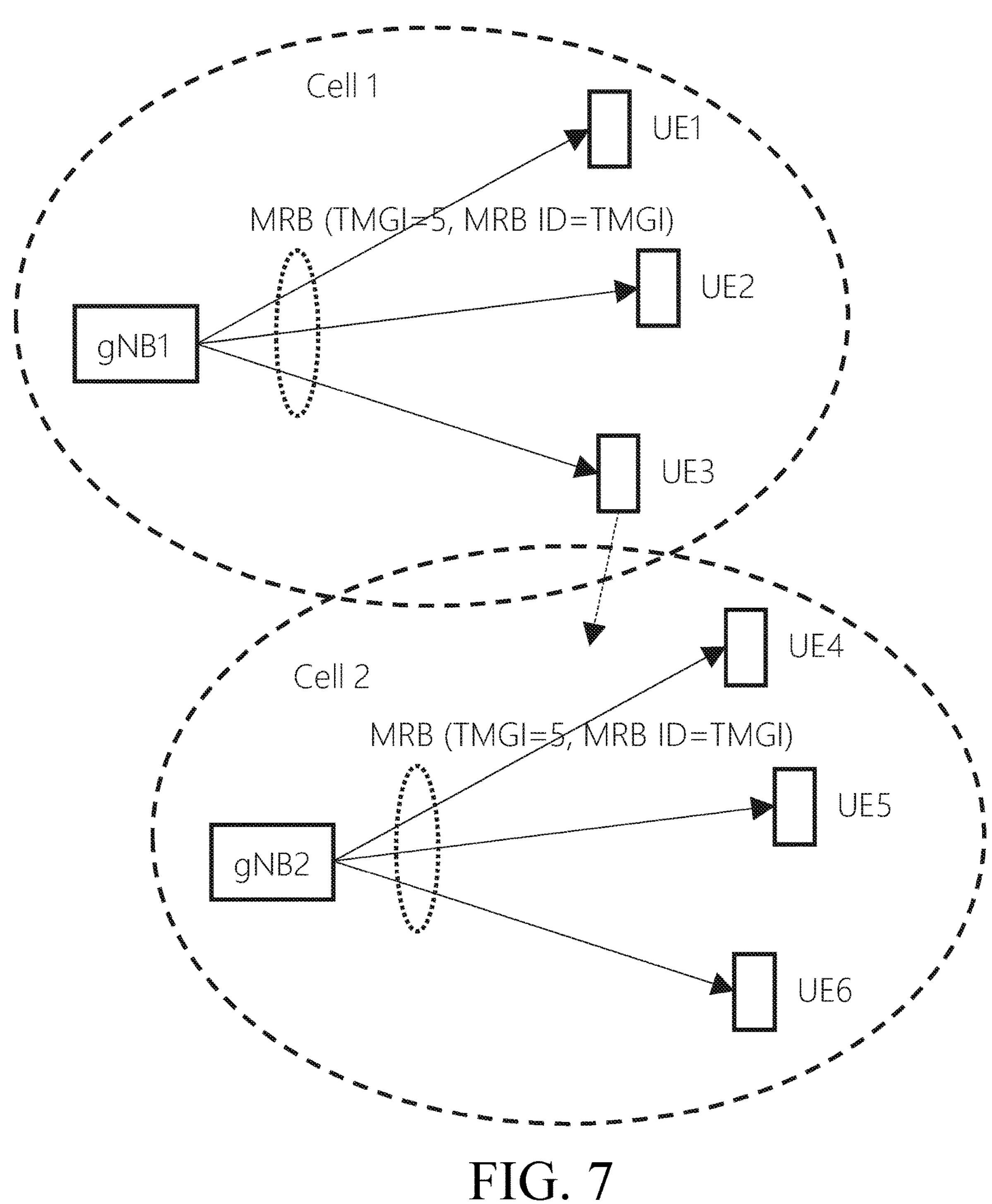
FIG. 7 illustrates an example of different MRB IDs used in different cells for the same multicast and broadcast service.

As illustrated in FIG. 7, the MRB ID space may be expanded to be as large as the MBS service ID (e.g., TMGI), and the MBS service ID may be used in RAN as MRB ID, according to an example embodiment. While similar to FIG. 1, the MBS service ID (TMGI) depicted in FIG. 7 may be used as an MRB ID. Thus, for a given MBS service, the same MRB ID may be used in different cells. The same MRB ID may be used throughout the network where the MBS service is provided; thus, there is no need to change the MRB ID when the UE moves from one cell to another. In this case, the RRCReconfiguration message may, for example, be updated by substituting "MRB Identity" with "TMGI-r17" as type for mrb-Identity-r17:

```
MRB-ToAddMod-r17 ::=   SEQUENCE {
  tmgi-r17             TMGI-r17                OPTIONAL, -- Cond MRBSetup
  mrb-Identity-r17     TMGI-r17,
  reestablishPDCP-r17  ENUMERATED{true}        OPTIONAL, -- Need N
  recoverPDCP-r17      ENUMERATED{true}        OPTIONAL, -- NEED N
  pdcp-Config-r17      PDCP-Config             OPTIONAL, -- Cond PDCP
  ...
}
```

Alternatively, the procedural text may define that TMGI is used as MRB ID, in which case MRB-ToAddMod would not include the IE mrb-Identity.

Figure 8:
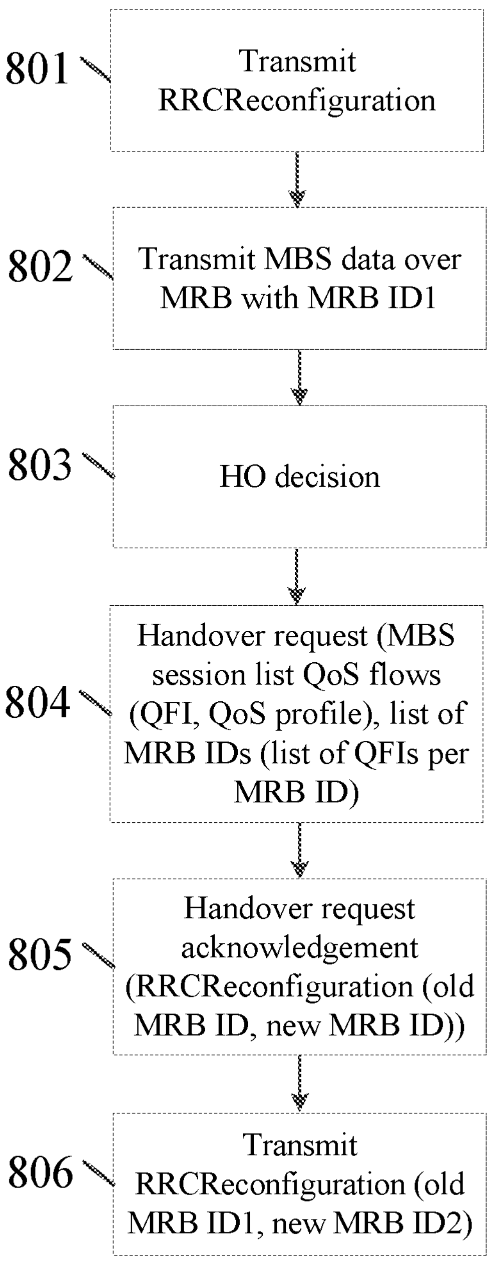
FIG. 8 illustrates a flow diagram of a method according to various example embodiments.

FIG. 8 illustrates an example of a flow diagram of a method for changing a MRB ID, according to an example embodiment. In the example of FIG. 8, the MRB ID may be changed via a RRCReconfiguration message by adding a field, such as 'mrb-IdentityNew,' into MRB-ToAddMod. In some example embodiments, the method of FIG. 8 may be performed by a source NE, such as NE 1510 illustrated in FIG. 15, according to various example embodiments. In this way, allowing MRB ID changes may simplify network deployments since MRB ID coordination between the cells may become unnecessary. The UE may initially be connected to a source NE, and after HO it connects to a target NE, the UE may be assumed to be connected to the target NE.

As illustrated in the example of FIG. 8, at 801, the method may include transmitting an RRCReconfiguration message to a UE, which may include MRBs associated with MRB IDs (e.g., MRB1 associated with MRB ID1). The UE may be similar to UE 1520 illustrated in FIG. 15, and may be configured with an MBS service in the source NE, where MRB ID1 is configured for the UE. For example, the RRCReconfiguration message may include a MRB-ToAddMod with a parameter, such as 'MRB-Identity.'

At 802, MBS data may be transmitted to the UE (and other UEs) over the MRB associated with MRB ID (configured MRB with MRB ID1). At 803, a handover decision to move the UE to another cell may be performed.

At 804, handover request may be transmitted to a target NE, which may also be similar to NE 1520. The handover request may include an MBS session list of QoS flows and the corresponding MRB ID(s). For example, the MBS session list may include for each QoS flow a QFI and a QoS profile, and the list of MRB IDs transmitted at 802 (i.e., list of QFIs per MRB ID).

At 805, a handover request acknowledgement may be received from the target NE. In various example embodiments, the handover request acknowledgement may include an RRCReconfiguration message with the old and new MRB IDs. For example, the information element (IE) mrb-Identity may be used for the old MRB ID, and a new IE mrb_IdentityNew may be introduced for the new MRB ID. Both parameters may be included, for example, into MRB-ToAddMod and may be configured similar to:

be changed without first releasing the MRB and then adding it with the new MRB ID. Furthermore, if the reestablishPDCP is set, and if drb-ContinueROHC is included in pdcp-Config, the lower layer may be indicated that drb-ContinueROHC is configured. If drb-ContinueEHC-DL is included in pdcp-Config, the lower layer may be indicated that drb-ContinueEHC-DL is configured. The PDCP entity of this multicast MRB may be re-established as specified in TS 38.323, clause 5.1.2. If the pdcp-Config is included, the PDCP entity may be reconfigured in accordance with the received pdcp-Config. When setting the reestablishPDCP flag for a radio bearer, the network may ensure that the RLC receiver entities do not deliver old PDCP PDUs to the re-established PDCP entity. It may do that e.g., by triggering a reconfiguration with sync of the cell group hosting the old RLC entity or by releasing the old RLC entity. The UE configuration may refer to the parameters configured by NR RRC unless otherwise.

At 806, a handover command may be transmitted to the UE, such as a RRCReconfiguration message, with the old and new MRB IDs, indicated as described above, to reconfigure the UE. In certain example embodiments, MRB-ToAddMod in the handover command (RRCReconfiguration message) may indicate both the old MRB ID (mrb-Identity) used in the source NE (MRB ID1) and the new MRB ID (mrb-IdentityNew) to be used in the target NE (MRB ID2), thus changing the MRB ID without release and add.

```
MRB-ToAddMod-r17 ::=     SEQUENCE {
  tmgi-r17               TMGI-r17                 OPTIONAL, -- Cond MRBSetup
  mrb-Identity-r17       MRB-Identity-r17,
  mrb-IdentityNew-r17      MRB-Identity-r17       OPTIONAL, -- Need N
  reestablishPDCP-r17      ENUMERATED{true}       OPTIONAL, -- Need N
  recoverPDCP-r17          ENUMERATED{true}       OPTIONAL, -- NEED N
  pdcp-Config-r17          PDCP-Config            OPTIONAL, -- Cond PDCP
  ...
}
```

Figure 9:
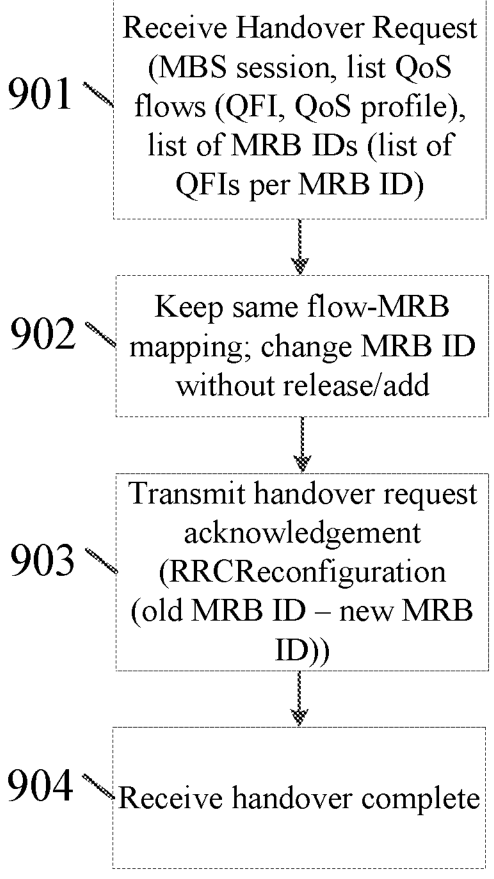
FIG. 9 illustrates a flow diagram of another method according to some example embodiments.

The new IE may only be allowed when certain security, i.e., encryption and integrity protection, is disabled for the MRB. In particular, multicast MRB addition/modification may specify that the UE may, for each mrb-Identity value included in the mrb-ToAddModList that is not part of the current UE configuration (multicast MRB establishment including the case when full configuration option is used), establish a PDCP entity and configure it in accordance with the received pdcp-Config. This shows that if the existing parameter mrb-Identity were used for changing the MRB ID, then the UE would establish a new MRB, not modify an existing MRB. If the multicast MRB was configured with the same tmgi prior to receiving this reconfiguration, the established multicast MRB may be associated with the corresponding tmgi. Otherwise, the establishment of the multicast MRB(s) and the tmgi of the established multicast MRB(s) may be indicated to upper layers. If an SDAP entity with the received tmgi does not exist, an SDAP entity may be established. In some example embodiments, the RRC procedure may be amended such that for each mrb-Identity value included in the mrb-ToAddModList that is part of the current UE configuration, if the mrb-IndentityNew is included, the MRB Identity of this MRB may be changed to new MRB Identity indicated by mrb-IndentityNew. With this addition and addition of the new parameter mrb-IdentityNew, the MRB ID of an already established MRB may FIG. 9 illustrates an example of a flow diagram of a method for changing a MRB ID with $X_n$ interface aspects, according to an example embodiment. In some example embodiments, the method of FIG. 9 may be performed by a target NE, such as NE 1510 illustrated in FIG. 15, according to various example embodiments. The decision trigger to change the MRB ID without release/add corresponding MRB, at the target NE involved in a UE mobility, may be the compatibility with the flow-MRB mapping received from a source NE (which may also be similar to NE 1510) during a handover.

At 901, the method may include receiving a handover request message from the source NE sent over $X_n$. The handover request message may indicate current MBS QoS flows to MRB mapping for all MRBs of the source NE. The handover request message may be configured to notify the target NE of a configuration used in the source NE (i.e., MRB IDs used for a UE (which may be similar to UE 1520), as well as MBS QoS flows (each MBS QoS flow may be indicated by MBS session ID and QFI) mapped to each MRB).

If the MBS QoS flow mapping to MRB in the target NE matches the MBS QoS flow mapping to MRB in the source NE, but the target NE uses different MRB ID for that MRB, then MRB IDs may be changed, as discussed above; however, if the MBS QoS flow mapping is different, other procedures may be used. As discussed above, Table 1 provides an example mapping of MRBs (MRB IDs) to MBS QoS flows in the source NE and the target NE, for when the target NE decides to continue the same MRB (same PDCP entity) in the UE after the handover, but has to change the MRB ID(s). Similarly, Table 2 above provides another example mapping of MRBs (MRB IDs) to MBS QoS flows in the source NE and the target NE.

In certain example embodiments, when the UE performs handover from the source NE to the target NE, both MRBs may continue in the target NE, but the MRB IDs have to be changed, for example, in the example case shown in Table 2, they need to be swapped.

In MBS HO, the UE may be configured with MRBs of the target NE, such that the MRBs initially only have PTP-leg. When PTP transmissions for the UE are in sync with the PTM transmissions, the UE may be reconfigured to receive the PTM transmissions. Since the PTP transmission is targeted only for a single UE, an MRB with PTP-leg only may be configured with any MRB ID. In certain example embodiments, the UE may be configured with the final MRB ID already in the HO command, and the later RRC reconfiguration may not require changes in the MRB ID when adding the PTM leg to the MRB.

In some example embodiments, the target NE may keep the source cell MRB IDs in the HO command when configuring the target cell MRBs with PTP legs only, and change the MRB IDs to those used in the target NE when reconfiguring the UE to also receive the PTM transmission. In this case, the MRB ID change would occur after the handover. An example of MRB ID change without HO in case, when using split network architecture with CU/DU split and CU-CP/CU-UP split, is discussed above with respect to FIG. 5.

At 902, upon receiving the MBS QoS flows-MRB mapping list from the source NE, the target NE may determine that it can reuse the configuration without releasing/adding MRBs (e.g., the same QoS flows may be mapped to an MRB), and may revise some of the MRB ID(s) to take into account the identifiers used at the target NE by the equivalent MRBs.

At 903, an $X_n$ handover request acknowledgement message may be sent to the source NE. A RRC reconfiguration message (i.e., RRC handover command) to be transmitted to the UE may be piggybacked in the $X_n$ handover request acknowledgement message. For example, the RRC reconfiguration message may indicate to the UE the change of MRB IDs for current MRBs. At 904, a handover complete message may be received from the UE. When the UE accesses the target NE, the UE may have the MRB configuration, which may be compatible with the MRB IDs used at the target NE.

Figure 10:
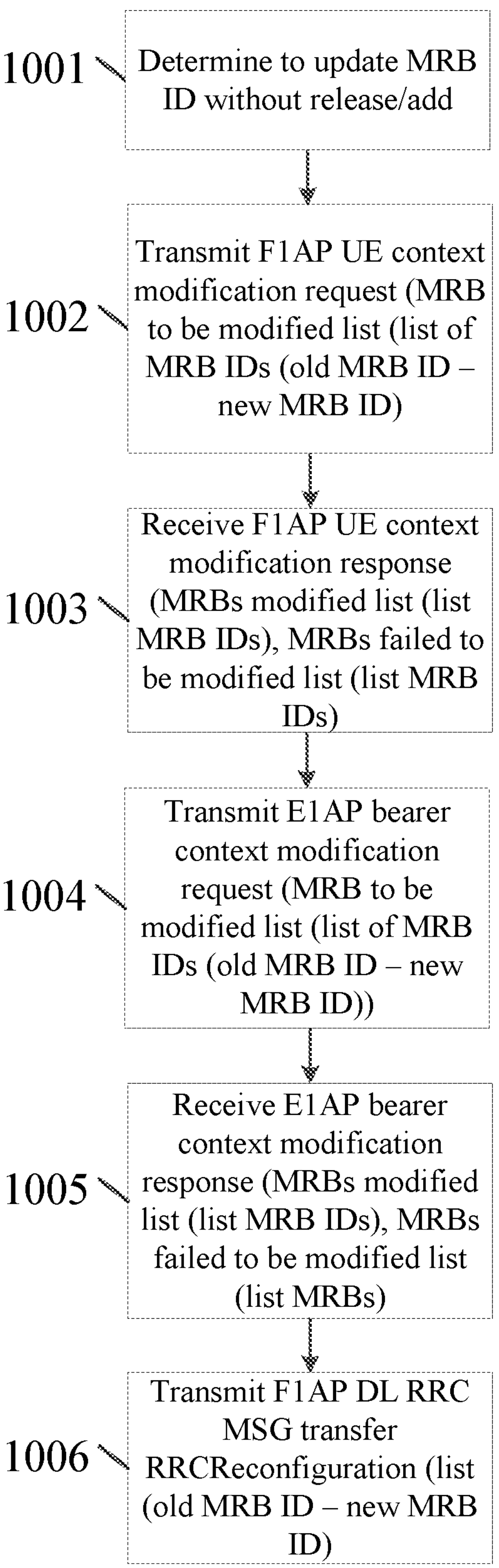
FIG. 10 illustrates a flow diagram of another method according to certain example embodiments.

FIG. 10 illustrates an example of a flow diagram of a method for changing a MRB ID with F1/E1 aspects, according to an example embodiment. In certain example embodiments, the method of FIG. 10 may be performed by a CU CP, such as NE 1510 illustrated in FIG. 15, according to various example embodiments. At 1001, the method may include deciding to update MRB identities without releasing/adding the MRBs.

At 1002, an F1AP UE Context Modification Request message (as an example) may be transmitted to a DU (which may be similar to NE 1510) including the list of MRB IDs for which the change is needed and for each MRB ID to be updated the (old MRB ID-new MRB ID) pair. In some example embodiments, Table 3 above shows how the F1AP UE Context Modification Request message may be configured.

At 1003, an FLAP UE context modification response may be received from the DU indicating which MRB identities may be successfully changed and which could not, which may include a MRBs modified list (list MRB IDs), and MRBs failed to be modified list (list MRB IDs).

At 1004, an E1AP Bearer Context Modification Request message (as an example) may be sent to a CU UP (similar to NE 1510) including the list of MRB IDs for which the change is needed and for each MRB ID to be updated the (old MRB ID-new MRB ID) pair. In various example embodiments, the IE shown in Table 4 above contains PDU session resources to modify related information used in a Bearer Context Modification Request.

At 1005, an E1AP bearer context modification response may be received from the CU UP indicating which MRB identities could be successfully changed and which could not, which may include a MRBs modified list (list MRB IDs), and MRBs failed to be modified list (list MRB IDs). At 1006, an RRC reconfiguration message (similar to the one discussed in FIG. 3) may be sent to the UE indicating the MRB IDs which could be changed successfully. The RRC message may be sent from the CU CP to the DU, for example, encapsulated into a FLAP DL RRC MSG transfer message. Subsequently, the DU may then transmit the encapsulated RRC message to the UE. In response, the UE may apply the indicated changes.

Figure 11:
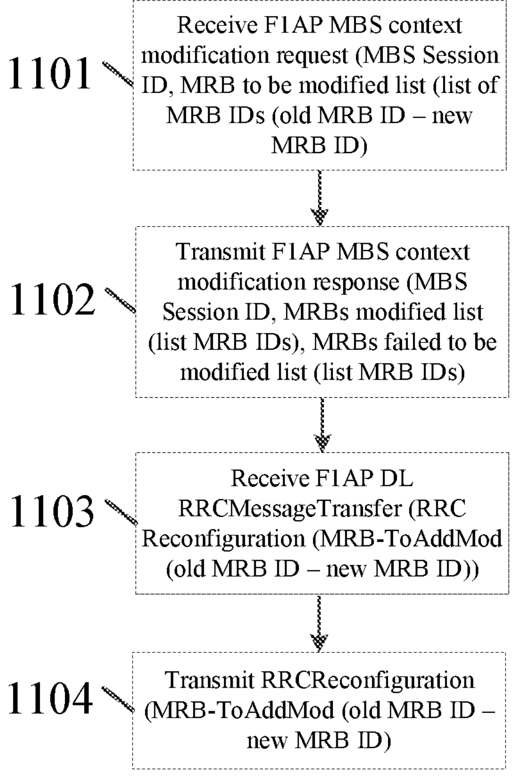
FIG. 11 illustrates a flow diagram of another method according to various example embodiments.

FIG. 11 illustrates an example of a flow diagram of a method for changing a MRB ID with F1/E1 aspects, according to an example embodiment. In some example embodiments, the method of FIG. 11 may be performed by a DU, such as NE 1510 illustrated in FIG. 15, according to various example embodiments.

In the example of FIG. 11, at 1101, the method may include receiving, for example, a non-UE associated message FLAP MBS Context Modification Request from a CU CP (similar to NE 1510). The request may include an MBS Session ID, MRB to be modified list (i.e., list of MRB IDs (old MRB ID-new MRB ID). The MRB ID change may then apply to all UEs receiving the MRB. Alternatively, UE-associated FLAP signalling could be used, for example, FLAP UE Context Modification Request. In that case, it may be specified that MRB ID change configured for one UE should be applied to all UEs receiving that MRB.

At 1102, the method may include transmitting, for example, a FLAP MBS context modification response back to the CU CP. For example, the response may include MBS Session ID and MRBs modified list (i.e., list MRB IDs), and MRBs failed to be modified list (list MRB IDs).

At 1103, the method may include receiving a FLAP DL RRCMessageTransfer to transfer an RRC message to a UE, which may include RRC Reconfiguration (i.e., MRB-ToAddMod (old MRB ID-new MRB ID)). Alternatively, the F1AP DL RRCMessageTransfer message may be a non-UE associated message if the encapsulated RRC message is a group RRC message intended to a group of UEs. Thus both UE associated F1 signaling with dedicated transmission of RRC message to a single UE (FIG. 5) and non-UE associated F1 signaling with group transmission of RRC message to group of UEs (FIG. 6) may be supported.

At 1104, the method may include transmitting a RRCReconfiguration message (i.e., MRB-ToAddMod (old MRB ID-new MRB ID) to a single UE (similar to UE 1520). Alternatively, the method may include transmitting a group RRCReconfiguration message (i.e., MRB-ToAddMod (old MRB ID—new MRB ID) to two or more UEs (similar to UE 1520).

The MRB ID space may be expanded to be as large as the MBS service ID (e.g., TMGI), and the MBS service ID may be used in RAN as MRB ID, according to an example embodiment. While similar to FIG. 1, the MBS service ID (TMGI) depicted in FIG. 6 may be used as an MRB ID. Thus, for a given MBS service, the same MRB ID may be used in different cells. The same MRB ID may be used throughout the network where the MBS service is provided; thus, there is no need to change the MRB ID when the UE moves from one cell to another. In this case, the RRCReconfiguration message may, for example, be updated as follows:

```
MRB-ToAddMod-r17 ::=  SEQUENCE {
  tmgi-r17              TMGI-r17              OPTIONAL, -- Cond MRBSetup
  mrb-Identity-r17      TMGI-r17,
  reestablishPDCP-r17   ENUMERATED{true}      OPTIONAL, -- Need N
  recoverPDCP-r17       ENUMERATED{true}      OPTIONAL, -- Need N
  pdcp-Config-r17       PDCP-Config           OPTIONAL, -- Cond PDCP
  ...
}
```

Alternatively, the procedural text may define that TMGI is used as MRB ID, in which case MRB-ToAddMod would not include the IE mrb-Identity.

Figure 12:
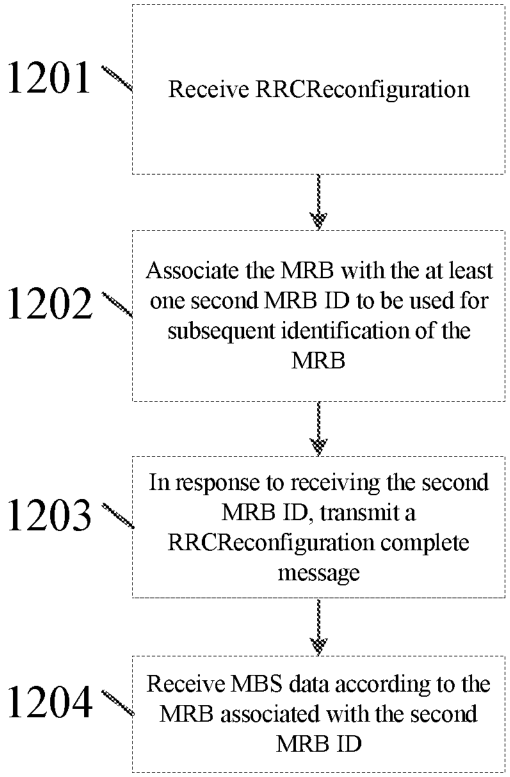
FIG. 12 illustrates a flow diagram of another method according to some example embodiments.

FIG. 12 illustrates an example of a flow diagram of a method depicting changing a MRB ID with a UE, according to an example embodiment. In some example embodiments, the method of FIG. 12 may be performed by a UE, such as UE 1520 illustrated in FIG. 15, according to various example embodiments. The UE may be configured with the MBS service with one MRB with MRB ID1.

At 1201, the UE receive a first RRC reconfiguration message from a network entity (which may be similar to NE 1510) comprising a list of at least one MRB. There may be multiple MRBs configured for a UE, wherein each UE may be identified by a single MRB ID. The MRB is identified by a first MRB ID and the RRC reconfiguration message may further comprise a second MRB ID associated with the first MRB ID. At 1202, the UE, in response to receiving the second MRB ID, may associate the MRB with the second MRB ID to be used for subsequent identification of the MRB. The MRB may only have one MRB ID at a time. The RRC message changing the MRB ID may contain two MRB IDs, the old MRB and a new MRB. But each MRB may only be associated with a single MRB ID. But as described here, the association may change.

At 1203, in response to receiving the (at least one) second MRB ID, the UE may transmit a RRC reconfiguration complete message to the network entity. At 1204, the UE may receive MBS data through the MRB associated with the at least one second MRB ID.

Figure 13:
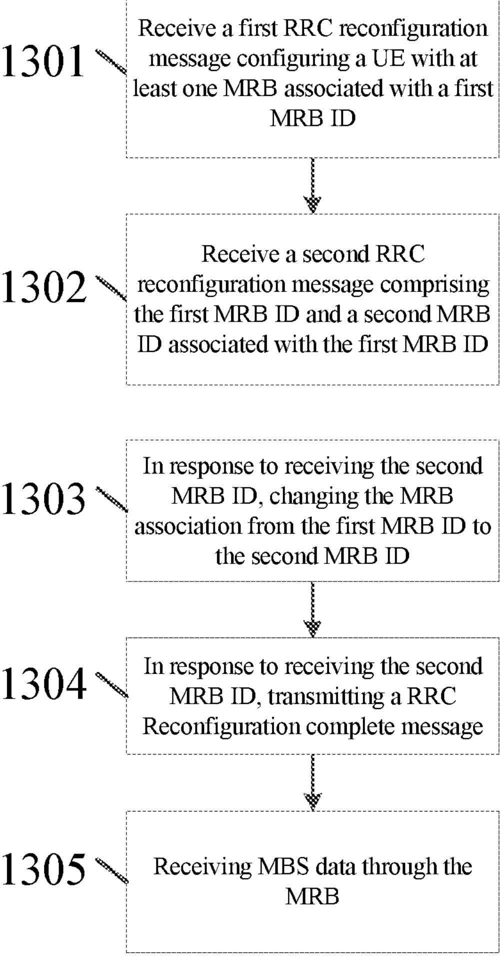
FIG. 13 illustrates a flow diagram of another method according to certain example embodiments.

FIG. 13 illustrates another example of a flow diagram of a method depicting changing a MRB ID with a UE, according to an example embodiment. In some example embodiments, the method of FIG. 13 may be performed by a UE, such as UE 1520 illustrated in FIG. 15, according to various example embodiments. The UE may be configured with the MBS service with at least one MRB each associated with an MRB ID.

At 1301, the UE may receive a first RRC reconfiguration message from a network entity (which may be similar to NE 1510) configuring the UE with at least one MRB associated with a first MRB ID. At 1302, the UE may receive a second RRC reconfiguration message from a network entity comprising the first MRB ID and a second MRB ID associated with the first MRB ID. The network entity at 1302 may be different from the network entity at 1301 (for example, in a handover case) or it may be the same.

At 1303, in response to receiving the second MRB ID (multicast and broadcast service radio bearer identifier), the UE may change the MRB association from the first MRB ID to the second MRB ID. At 1304, in response to receiving the second MRB ID, the UE may transmit a RRC reconfiguration complete message to the network entity. This network entity may be the same as network entity at 1302. At 1305, the UE may receive MBS data through the MRB now associated with the second MRB ID.

Figure 14:
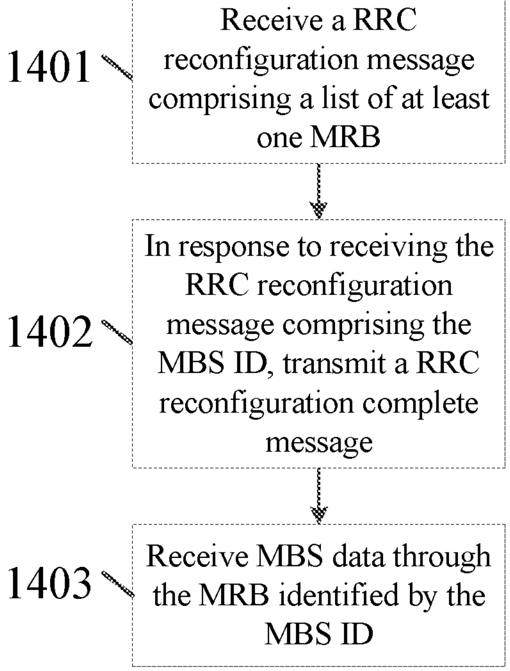
FIG. 14 illustrates a flow diagram of another method according to various example embodiments.

FIG. 14 illustrates another example of a flow diagram of a method depicting configuring a MRB ID with a UE, according to an example embodiment. In some example embodiments, the method of FIG. 14 may be performed by a UE, such as UE 1520 illustrated in FIG. 15, according to various example embodiments. The UE may be configured with the MBS service with at least one MRB each associated with an MRB ID.

At 1401, the UE may receive a RRC reconfiguration message from a network entity comprising a list of at least one MRB. The MRB may be identified by a MBS ID. At 1402, in response to receiving the RRC reconfiguration message comprising the MBS ID, the UE may transmit a RRC reconfiguration complete message to the network entity. At 1403, the UE may receive MBS data through the MRB identified by the MBS identifier. The MBS ID may be configured as a MRB ID. The MBS ID may comprise at least a TMGI.

FIG. 15 illustrates an example of a system according to certain example embodiments. In one example embodiment, a system may include multiple devices, such as, for example, NE 1510 and/or UE 1520.

NE 1510 may be one or more of a base station, such as an eNB or gNB, a serving gateway, a server, and/or any other access node or combination thereof. Furthermore, NE 1510 and/or UE 1520 may be one or more of a citizens broadband radio service device (CBSD).

NE 1510 may further comprise at least one gNB-CU, which may be associated with at least one gNB-DU. The at least one gNB-CU and the at least one gNB-DU may be in communication via at least one F1 interface. The at least one gNB-CU may be in communication with another gNB-CU via at least one $X_n$-C interface, and/or via at least one NG interface to a 5GC.

UE 1520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 1510 and/or UE 1520 may include at least one processor, respectively indicated as 1511 and 1521. Processors 1511 and 1521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1512 and 1522. The memory may be fixed or removable. The memory may include computer program instructions or computer code contained therein. Memories 1512 and 1522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1511 and 1521, memories 1512 and 1522, and any subset thereof, may be configured to provide means corresponding to the various blocks of FIGS. 2-6 and 8-14. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 15, transceivers 1513 and 1523 may be provided, and one or more devices may also include at least one antenna, respectively illustrated as 1514 and 1524. The device may have many antennas, such as an array of antennas configured for multiple input multiple output (MIMO) communications, or multiple antennas for multiple RATs. Other configurations of these devices, for example, may be provided. Transceivers 1513 and 1523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 2-6 and 8-14). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 2-6 and 8-14. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 16:
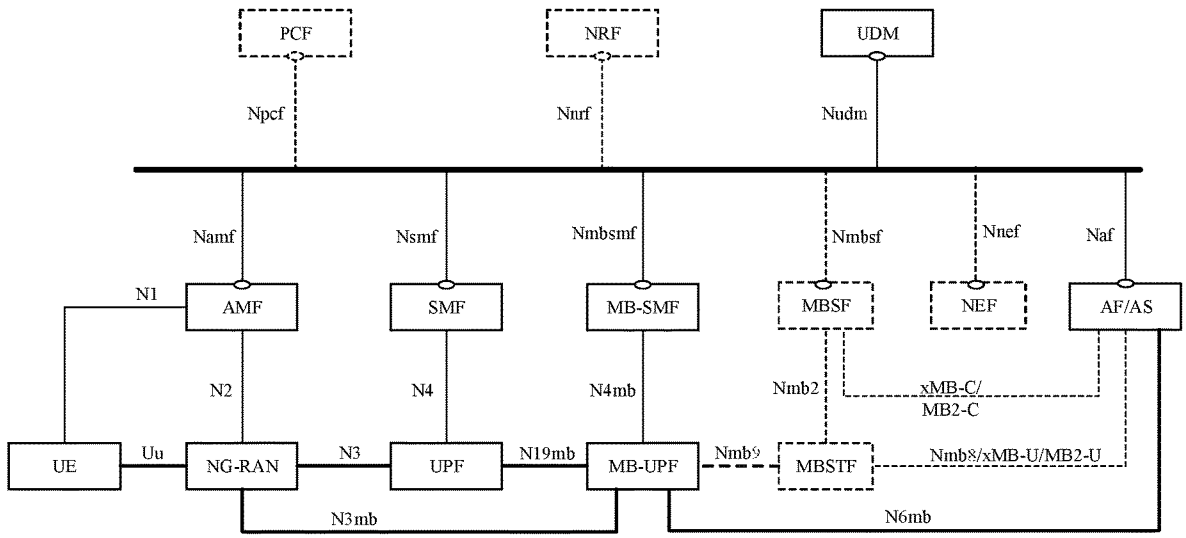
FIG. 16 illustrates an example of a 5G network and system architecture according to certain example embodiments.

FIG. 16 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 16 may be similar to NE 1510 and UE 1520, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processor 1511 and memory 1512 may be included in or may form a part of processing circuitry or control circuitry. In addition, in some example embodiments, transceiver 1513 may be included in or may form a part of transceiving circuitry.

In some example embodiments, an apparatus (e.g., NE 1510 and/or UE 1520) may include means for performing a method, a process, or any of the variants discussed herein. Examples of the means may include one or more processors, memory, controllers, transmitters, receivers, and/or computer program code for causing the performance of the operations.

In various example embodiments, apparatus 1510 may be controlled by memory 1512 and processor 1511 to perform any of the processes described above (i.e., FIGS. 2-6 and 8-14).

Certain example embodiments may be directed to an apparatus that includes means for performing any of the methods described herein including, for example, means for perform any of the processes described above (i.e., FIGS. 2-6 and 8-14).

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

| Partial Glossary | |
|---|---|
| 3GPP | Third Generation Partnership Project |
| 5G | Fifth Generation |
| 5GC | Fifth Generation Core |
| 5GS | Fifth Generation System |
| ACK | Acknowledgement |
| AMF | Access and Mobility Management Function |
| ASIC | Application Specific Integrated Circuit |
| CBSD | Citizens Broadband Radio Service Device |
| CN | Core Network |
| CPU | Central Processing Unit |
| CU | Central Unit |
| CU CP | Central Unit Control Plane |
| CU UP | Central Unit User Plane |
| DL | Downlink |
| DRB | Data Radio Bearer |
| DU | Distributed Unit |
| eMBB | Enhanced Mobile Broadband |
| eNB | Evolved Node B |
| gNB | Next Generation Node B |
| GPS | Global Positioning System |
| HDD | Hard Disk Drive |
| HO | Handover |
| LTE | Long-Term Evolution |
| LTE-A | Long-Term Evolution Advanced |
| MBS | Multicast and Broadcast Service |
| MC | Multicast |
| MEMS | Micro Electrical Mechanical System |
| MIMO | Multiple Input Multiple Output |
| mMTC | Massive Machine Type Communication |
| MRB | Multicast and Broadcast Service Radio Bearer |
| MTC | Machine Type Communication |
| NAS | Non-Access Stratum |
| NE | Network Entity |
| NG | Next Generation |
| NG-eNB | Next Generation Evolved Node B |
| NG-RAN | Next Generation Radio Access Network |
| NR | New Radio |
| NR-U | New Radio Unlicensed |
| PDA | Personal Digital Assistance |
| PDCP | Packet Data Convergence Protocol |
| PDU | Protocol Data Unit |
| PTM | Point-to-Multipoint |
| PTP | Point-to-Point |
| QFI | Quality of Service Flow Identifier |
| QoS | Quality of Service |
| RAM | Random Access Memory |
| RAN | Radio Access Network |
| RAT | Radio Access Technology |
| RE | Resource Element |
| RLC | Radio Link Control |
| RRC | Radio Resource Control |
| SMF | Session Management Function |
| SRB | Signaling Radio Bearer |
| TMGI | Temporary Mobile Group Identity |
| UE | User Equipment |
| UMTS | Universal Mobile Telecommunications System |
| UPF | User Plane Function |
| URLLC | Ultra-Reliable and Low-Latency Communication |
| UTRAN | Universal Mobile Telecommunications System Terrestrial Radio Access Network |

We claim:

1. An apparatus, comprising:
at least one processor; and
at least one memory including computer program code,
wherein the at least one memory and the computer program code are configured to, with the at least one processor, cause the apparatus at least to:
receive a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier;
associate the multicast and broadcast radio bearer with the second multicast and broadcast service radio bearer identifier configured for subsequent identification of the multicast and broadcast radio bearer; and
receive multicast and broadcast service data through the multicast and broadcast radio bearer associated with the second multicast and broadcast service radio bearer identifier.

2. The apparatus of claim 1, wherein the at least one memory and the computer program code are further configured to, with the at least one processor, cause the apparatus at least to:
in response to receiving the second multicast and broadcast service radio bearer identifier, transmit a radio resource control reconfiguration complete message to the network entity.

3. The apparatus of claim 1, wherein a packet data convergence protocol entity of the apparatus is configured to receive multicast and broadcast service data through the multicast and broadcast service radio bearer prior to and after changing the multicast and broadcast service radio bearer association from the first multicast and broadcast service radio bearer identifier to the second multicast and broadcast service radio bearer identifier.

4. The apparatus of claim 1, wherein the radio resource control reconfiguration message comprises a reconfiguration within a cell or a handover command to change the cell.

5. The apparatus of claim 1, wherein the at least one memory and the computer program code are further configured to, with the at least one processor, cause the apparatus at least to:
in response to the radio resource control reconfiguration message comprising a handover command to change the cell, transmit the radio resource control reconfiguration complete message to a target network entity.

6. The apparatus of claim 1, wherein the first multicast and broadcast service radio bearer identifier comprises a mrb-Identity field and the second multicast and broadcast service radio bearer identifier associated with the first multicast and broadcast service radio bearer identifier comprises a mrb-Identity New field, wherein the mrb-Identity and mrb-IdentityNew fields are comprised within a single MRB-ToAddMod information element.

7. An apparatus, comprising:
at least one processor; and
at least one memory including computer program code,
wherein the at least one memory and the computer program code are configured to, with the at least one processor, cause the apparatus at least to:

receive a handover request from a source network entity, wherein the handover request comprises a first multicast and broadcast service radio bearer identifier and a list comprising at least one quality of service flow identifier associated with the first multicast and broadcast service radio bearer identifier; and transmit, within a handover request acknowledgement, a multicast and broadcast service radio bearer configuration to a user equipment comprising the first multicast and broadcast service radio bearer identifier and a second multicast and broadcast service radio bearer identifier associated with the first multicast and broadcast service radio bearer identifier.

8. The apparatus of claim 7, wherein the at least one memory and the computer program code are further configured to, with the at least one processor, cause the apparatus at least to:

identify the first multicast and broadcast service radio bearer identifier to be changed to the second multicast and broadcast service radio bearer identifier based on the received list comprising the at least one quality of service flow identifier associated with the first multicast and broadcast service radio bearer identifier.

9. The apparatus of claim 7, wherein the at least one memory and the computer program code are further configured to, with the at least one processor, cause the apparatus at least to:

identify the second multicast and broadcast service radio bearer identifier based upon the first multicast and broadcast service radio bearer identifier.

10. The apparatus of claim 7, wherein the handover request acknowledgement is associated with an $X_n$ interface handover request acknowledgment message.

11. The apparatus of claim 7, wherein the handover request is associated with an $X_n$ interface handover request message.

12. The apparatus of claim 7, wherein the at least one memory and the computer program code are further configured to, with the at least one processor, cause the apparatus at least to:

receive a handover complete message from the user equipment indicating that the multicast and broadcast service radio bearer configuration has been updated.

13. The apparatus of claim 7, wherein the at least one memory and the computer program code are further configured to, with the at least one processor, cause the apparatus at least to:

determine that at least one set of multicast and broadcast service quality of service flows mapping to a multicast and broadcast service radio bearer in the target network entity matches at least one set of multicast and broadcast service quality of service flows mapping to a multicast and broadcast service radio bearer in the source network entity, and that the target network entity uses at least one different multicast and broadcast service radio bearer identifier for that multicast and broadcast service radio bearer than the one of the multicast and broadcast service radio bearer in the source network entity.

14. A method, comprising:

receiving a radio resource control reconfiguration message from a network entity comprising a multicast and broadcast radio bearer wherein the multicast and broadcast radio bearer is identified by a first multicast and broadcast service radio bearer identifier and the radio resource control reconfiguration message further comprising a second multicast and broadcast service radio bearer identifier associated with the first multicast and broadcast service radio bearer identifier;

associating the multicast and broadcast radio bearer with the second multicast and broadcast service radio bearer identifier configured for subsequent identification of the multicast and broadcast radio bearer; and receiving multicast and broadcast service data through the multicast and broadcast radio bearer associated with the second multicast and broadcast service radio bearer identifier.

15. The method of claim 14, wherein the first multicast and broadcast service radio bearer identifier comprises a mrb-Identity field and the second multicast and broadcast service radio bearer identifier associated with the first multicast and broadcast service radio bearer identifier comprises a mrb-Identity New field, wherein the mrb-Identity and mrb-IdentityNew fields are comprised within a single MRB-ToAddMod information element.

16. The method of claim 14, further comprising:

in response to receiving the second multicast and broadcast service radio bearer identifier, transmitting a radio resource control reconfiguration complete message to the network entity.

17. The method of claim 14, wherein a packet data convergence protocol entity of the apparatus is configured to receive multicast and broadcast service data through the multicast and broadcast service radio bearer prior to and after changing the multicast and broadcast service radio bearer association from the first multicast and broadcast service radio bearer identifier to the second multicast and broadcast service radio bearer identifier.

18. The method of claim 14, wherein the radio resource control reconfiguration message comprises a reconfiguration within a cell or a handover command to change the cell.

19. The method of claim 14, further comprising:

in response to the radio resource control reconfiguration message comprising a handover command to change the cell, transmitting the radio resource control reconfiguration complete message to a target network entity.

* * * * *